US007653512B2

(12) United States Patent
Cheung et al.

(10) Patent No.: US 7,653,512 B2
(45) Date of Patent: Jan. 26, 2010

(54) PRECISION DIAGNOSTIC METHOD FOR THE FAILURE PROTECTION AND PREDICTIVE MAINTENANCE OF A VACUUM PUMP AND A PRECISION DIAGNOSTIC SYSTEM THEREFOR

(75) Inventors: Wan Sup Cheung, Daejeon (KR); Jong Yeon Lim, Daejeon (KR); Kwang Hwa Chung, Daejeon (KR); Soo Gab Lee, Seoul (KR)

(73) Assignee: Korea Reserch Institute of Standards and Science (KR)

( * ) Notice: Subject to any disclaimer, the term of this patent is extended or adjusted under 35 U.S.C. 154(b) by 0 days.

(21) Appl. No.: 11/721,944

(22) PCT Filed: Dec. 17, 2004

(86) PCT No.: PCT/KR2004/003330

§ 371 (c)(1),
(2), (4) Date: Jul. 6, 2007

(87) PCT Pub. No.: WO2006/064991

PCT Pub. Date: Jun. 22, 2006

(65) Prior Publication Data

US 2008/0109185 A1    May 8, 2008

(51) Int. Cl.
| | |
|---|---|
| G06F 11/32 | (2006.01) |
| G06F 11/30 | (2006.01) |
| G06F 11/00 | (2006.01) |
| G06F 19/00 | (2006.01) |
| G06F 17/40 | (2006.01) |

(52) U.S. Cl. .................... 702/184; 73/865.9; 702/1; 702/33; 702/34; 702/127; 702/182; 702/183; 702/187; 702/189

(58) Field of Classification Search ............... 73/432.1, 73/865.9; 340/500, 540, 567; 377/13, 15, 377/16; 702/1, 33, 34, 127, 182, 183, 184, 702/185, 187, 188, 189
See application file for complete search history.

(56) References Cited

U.S. PATENT DOCUMENTS 2,883,255 A  *  4/1959  Anderson ................ 346/34

(Continued)

FOREIGN PATENT DOCUMENTS

KR    1019980042363    8/1998

(Continued)

OTHER PUBLICATIONS

R. Bahnen and M Kuhn, "Increased reliability of dry pumps due to process related adaptation and pre-failure warning," Vacuum, vol. 44, No. 5-7, pp. 709-712, 1993.

(Continued)

Primary Examiner—Edward R Cosimano
(74) Attorney, Agent, or Firm—Steptoe & Johnson LLP

(57) ABSTRACT

According to the present invention, the most challenging issues in this work have been to find systematic ways of enabling maintenance engineers to decide an adequate time for the replacement of vacuum pumps on the basis of their current performance assessment result. Further, the comparison of the currently evaluated diagnostics analysis results and the initial (or reference) data set is shown to enable maintenance engineers to decide the replacement of the considered vacuum pump according to the evaluated pump performance indicators. This quantitative diagnostic analysis result is expected not only to enable maintenance engineers to decide an adequate time for the replacement of vacuum pumps on the basis of their current performance assessment results but also to improve the reliability and confidence of the predictive maintenance of low vacuum pumps.

11 Claims, 18 Drawing Sheets

U.S. PATENT DOCUMENTS

| | | | | |
|---|---|---|---|---|
| 3,257,652 | A * | 6/1966 | Foster | 340/521 |
| 4,945,254 | A * | 7/1990 | Robbins | 250/559.16 |
| 6,277,199 | B1 * | 8/2001 | Lei et al. | 118/696 |
| 6,758,051 | B2 * | 7/2004 | Jayanth et al. | 62/126 |
| 7,313,923 | B2 * | 1/2008 | Jayanth et al. | 62/126 |
| 2002/0170299 | A1 * | 11/2002 | Jayanth et al. | 62/126 |
| 2003/0009311 | A1 * | 1/2003 | Ushiku et al. | 702/184 |
| 2003/0115890 | A1 * | 6/2003 | Jayanth et al. | 62/126 |
| 2003/0154052 | A1 * | 8/2003 | Samata et al. | 702/184 |
| 2003/0154997 | A1 * | 8/2003 | Lin | 132/307 |
| 2003/0158705 | A1 * | 8/2003 | Ishii et al. | 702/183 |
| 2004/0154319 | A1 * | 8/2004 | Jayanth et al. | 62/129 |

FOREIGN PATENT DOCUMENTS

| | | | |
|---|---|---|---|
| WO | WO 02/057856 A2 | * | 7/2002 |
| WO | WO 02/086726 A1 | * | 10/2002 |
| WO | WO 2006/064990 A1 | * | 6/2006 |

OTHER PUBLICATIONS

W. H. Woodall, R. Koudelik, Z. G. Stoumbos, K. L. Tsui, S. B. Kim, C P. Carvounis, "A review and analysis of the Mahalanobis-Taguchi system," TECHNOMETRICS, vol. 45, No. 1, pp. 1-14, 2003.

J. Y. Lim, S. H. Jung, W. S. Cheung, K. H. Chung, Y. H. Shin, S. S. Hong, and W. G. Sim, "Expanded characteristics evaluation for low vacuum dry pumps," AVS 49th International Symposium, x-x, 2002.

J. Y. Lim, W. S. Cheung, J. H. Joo, Y. O. Kim, W. G. Sim, and K. H. Chung, "Characteristics evaluation practice of predictable performance monitoring for low vacuum dry pumps," AVS 50th International Symposium, 9-10, 2003.

W. S. Cheung, J. Y. Lim and K. H. Chung, "Experimental study on noise characteristics of dry pumps," Inter-noise 2002, Port Lauddale: USA, 2002.

W. S. Cheung, J. Y. Lim and K. H. Chung, "Acoustical characteristics of dry pumps designed for semiconductor processes," Inter-noise 2003, Jeju, Korea, 2003.

Z. G. Stoumbos, "Process capability indices: Review and extensions," Nonlinear Analysis: Real World Applications, vol. 3, pp. 191-210, 2002.

R. H. Greene and D. A. Casada, Detection of pump degradation, NUREG/CR-6089/ORNL-6765, Oak Ridge National Laboratory, 1995.

Wan-Sup Cheung, "Identification, stabilization and control of nonlinear systems using the neural network-based parametric nonlinear modelling," Ph.D. Thesis, University of Southampton, 1993.

J. S. Bendat A. G. Piersol, Random data: Analysis and measurement procedures, John Wiley & Sons: N.Y., 1985.

B. Widrow and S. D. Steams, Adaptive Signal Processing, Prantice-Hall, Englewood Cliffs: NJ, 1985.

P. A. Nelson and S. J. Elliott, Active Control of Sound, Academic Press, London, England, 1992.

Harvey Wohlwend, e-Diagnostics Guidebook, International SEMATECH, Version 1.5, Oct. 2002.

Nigel. S. Hariss, Modern Vacuum Practice, McGraw-Hill Book Company, Lendon: England, 1989.

* cited by examiner

PRECISION DIAGNOSTIC METHOD FOR THE FAILURE PROTECTION AND PREDICTIVE MAINTENANCE OF A VACUUM PUMP AND A PRECISION DIAGNOSTIC SYSTEM THEREFOR

TECHNICAL FIELD

The present invention relates to the precision diagnostic method and implementation system for the predictive maintenance of vacuum pumps, especially for semiconductor manufacturing processes having multiple operation conditions.

BACKGROUND ART

Demands on availability and reliability of vacuum pumps in modern semiconductor manufacturing processes have been constantly increasing. It is the reason that the costs for failed wafer batches and lost production times are higher and higher as the size of the production wafer is larger and larger. Technical demands on the vacuum pumps for such modern semiconductor processes have been well pointed out by Bahnen and Kuhn [Reference 1: R. Bahnen and M Kuhn, "Increased reliability of dry pumps due to process related adaptation and pre-failure warning," Vacuum, Vol. 44, No 5-7, pp. 709-712, 1993]: High reliability without unscheduled downtime, very low maintenance, high capability of pumping corrosive and reactive gas mixtures, high capability of pumping particles and sublimable gas mixtures, and low vibration and noise levels, etc. In order to satisfy those demands, a new dry pump for the modern semiconductor processes should provide not only the adaptation capability for the various process-dependent running conditions but also the monitoring schemes of the pump operation-related parameters (electrical power, cooling water, purge gas, wear of pump parts—bearings, seals, gear box, and motor) to avoid the risk of unscheduled downtime. Bahnen and Kuhn [Ref. 1] suggested the warning and alarm level-based monitoring scheme for the process-related or operation-related parameters to avoid unexpected pump failures. But, any logical way of selecting all the warning and alarming levels of process-dependent and operation-related parameters are not proposed. Such threshold level selection is still a very challenging issue in the early detection of vacuum pump failure. Moreover, the proposed monitoring scheme does not provide any technical way of determining an appropriate replacement time of a vacuum pump issuing warning or alarm signals. It has been also another challenging issue to vacuum pump maintenance engineers. It is the reason that either warning or alarm is not a direct indicator for the pump replacement and that pump maintenance engineers can determine pump replacement only after examining sufficient technical information about the evaluated vacuum pump performance and monitored running conditions. This work will be shown not only to present a systematic way of accessing the quantitative degradation of vacuum pumps that have issued the warning or alarm signals but also to enable pump maintenance engineers to determine pump replacement on the basis of the performance assessment results.

The threshold level-based monitoring has been widely recognized as a traditional technique for the failure protection of pumps [Reference 2: R. H. Greene and D. A. Casada, Detection of pump degradation, NUREG/CR-6089/ORNL-6765, Oak Ridge National Laboratory, 1995]. Wegerich et al [Reference 3: S. W. Wegerich, D. R. Bell and X. Xu, "Adaptive modeling of changed states in predictive condition monitoring," WO 02/057856 A2, 2002; Reference 4: S. W. Wegerich, A. Wolosewicz and R. M Pipke, "Diagnostic systems and methods for predictive condition monitoring," WO 02/086726 A1, 2002], however, pointed out the drawbacks of the sensor output-based threshold warning and alarming schemes: "The traditional technique could not provide responses to gross changes in operational parameters of a process or machine, often failed to provide adequate warning to prevent unexpected shutdowns, equipment damage or catastrophic safety hazards." In order to overcome such limit of the traditional technique, they suggested the use of the neural network-based parametric model adaptive to new operational states [Ref. 3] and the model-based diagnostic systems for predictive condition monitoring [Ref. 4]. The neural network model, as known in the previous study [Reference 5: Wan-Sup Cheung, "Identification, stabilization and control of nonlinear systems using the neural network-based parametric nonlinear modelling," Ph.D. Thesis, University of Southampton, 1993] on the identification and control of dynamic systems, has the useful capability of interpolating a new state lying between trained data sets and extrapolating a neighboring state outside (but very near) the trained sets. Wegerich et al [Ref. 3, Ref. 4] exploited the interpolation and extrapolation capability [Ref. 5] of the trained neural network to estimate the current state of the process or machine in response to the measured values of sensor outputs. The residuals between the estimated state values and the measured ones are also used to generate the residual threshold alert, to perform the statistical test to check the shift of the process or system to a new operation condition, and to rebuild up a new training set for the shifted operation region. The suggested signal processing schemes of generating the alerts and adapting to the shifted operation region, including the construction of the new training set for the shifted operation region and their model learning process, are seen not only to require severe computation work but also to accompany the inherent complexity of the suggested model-based diagnostic system. Such unrealistic computation load and implementation complexity of the suggested monitoring system has became unavoidable technical issues encountered in the pump monitoring and diagnostic systems for the modern semiconductor manufacturing processes. Moreover, the suggested model-based diagnostic system does not provide any systematic way of evaluating of the performance of the vacuum pumps running under the varied operation conditions. Consequently, these technical issues have been the main motivation of this invention to develop not only a simple model adaptive to the pump operation conditions but also the new evaluation schemes of the vacuum pump performance indicators applicable to the pump-installed sites. This work proposes the predictive maintenance scheme of vacuum pumps, which always estimates the pump performance indicators whenever warning or alarm signals are observed. This direct performance evaluation scheme needs neither training sets nor trained models suggested by Wegerich et al [Ref. 3, Ref. 4].

Instead of using the above parametric models adaptive to varying operation conditions of vacuum pumps with age, Ushiku et al [Reference 6: Y. Ushiku, T. Arikado, S. Samata, T. Nakao, and Y. Mikata, "Apparatus for predicting life of rotary machine, equipment using the same, method for predicting life and determining repair timing of the same," U.S. Patent Application Publication, US2003/0009311 A1, 2003], Samata et al [Reference 7: S. Samata, Y. Ushiku, K. Ishii, and T. Nakao, "Method for diagnosing life of manufacturing equipment using rotary machine," U.S. Patent Application Publication, US2003/0154052 A1, 2003; Reference 8: S. Samata, Y. Ushiku, T. Huruhata, T. Nakao, and K. Ishii, "Method for predicting life span of rotary machine used in manufacturing apparatus and life predicting system," U.S. Patent Application Publication, US2003/01543997 A1, 2003] and Ishii et al [Reference 9: K. Ishii, T. Nakao, Y. Ushiku, and S. Samata, "Method for avoiding irregular shut-off of production equipment and system for irregular shutoff," U.S. Patent Application Publication, US2003/0158705 A1, 2003] suggested the statistical analysis methods and the Mahalanobis distance-based analysis method [Reference 10: W. H. Woodall, R. Koudelik, Z. G. Stoumbos, K. L. Tsui, S. B. Kim, C P. Carvounis, "A review and analysis of the Mahalanobis-Taguchi system," TECHNOMETRICS, Vol. 45, No. 1, pp. 1-14, 2003] to determine whether or not the currently measured time series data are deviated from the "reference" time series data set corresponding to the normal operation conditions. The statistical analysis methods are based on the second order statistical properties of sampled signals [Reference 11: J. S. Bendat A. G. Piersol, Random data: Analysis and measurement procedures, John Wiley & Sons: N.Y., 1985], such as the averaged values, standard deviations, and correlation functions. Because the use of the statistical properties makes sense only to the stationary processes, they have limited applicability to multiple load-dependent operation conditions required for the different products. It means that each reference time series data set corresponding to each load-dependent operation is required. A critical issue here is how to construct the data sets of load-dependent reference time series sufficient to cover the full range of normal operation conditions. Any effective way for constructing them is not yet proposed by Y. Ushiku et al [Ref. 6], Samata et al [Ref. 7, Ref. 8] and Ishii et al [Ref. 9]. Although the time series of normal operation conditions for new or reconditioned vacuum pumps are available only at the very beginning of each designated process, the reference data with the full range of normal operation conditions could be not obtained without the time-consuming data acquisition and signal processing jobs. In reality, a modern semiconductor fabrication unit requires multiple processes with such different operation conditions as varying camber pressures, gas flow rates, and different gas mixtures and properties. Those process-related properties and operation conditions of semiconductor manufacturers are very confidential such that they are very often inaccessible to the vacuum pump suppliers. It is very significant to note that a vacuum pump monitoring and diagnosis system for the modern semiconductor processes should have the capacity of self-adapting to multiple process conditions. It should be noted that since the proposed statistical analysis methods [Ref. 6-Ref. 9] do not consider any systematic basis of evaluating the vacuum pump performance indicators they can not provide any quantitative data of pump degradation that enables pump maintenance engineers to determine an suitable time for pump replacement. This invention will be shown to provide a realistic solution to solve such technical issues later, without using the reference data with the wide range of normal operation conditions collected in the previous work [Ref. 6-Ref. 9].

DISCLOSURE OF INVENTION

Technical Problem

The inventors of this application have already developed the accurate performance test and evaluation methods of low vacuum pumps and published their experimental results in several technical papers [Reference 12: J. Y. Lim, S. H. Jung, W. S. Cheung, K. H. Chung, Y. H. Shin, S. S. Hong, and W. G. Sim, "Expanded characteristics evaluation for low vacuum dry pumps," AVS 49th International Symposium, x-x, 2002; Reference 13: J. Y. Lim, W. S. Cheung, J. H. Joo, Y. O. Kim, W. G. Sim, and K. H. Chung, "Characteristics evaluation practice of predictable performance monitoring for low vacuum dry pumps," AVS 50th International Symposium, 9-10, 2003; Reference 14: W. S. Cheung, J. Y. Lim and K. H. Chung, "Experimental study on noise characteristics of dry pumps," Inter-noise 2002, Port Lauddale: USA, 2002; Reference 15: W. S. Cheung, J. Y. Lim and K. H. Chung, "Acoustical characteristics of dry pumps designed for semiconductor processes," Inter-noise 2003, Jeju, Korea, 2003]. Those experiments were carried out on the low vacuum pump test bench whose schematic drawing is shown in FIG. 1.

The test bench has been used to evaluate the performance factors of low vacuum pumps, such as the pumping speed (volume flow rate), the ultimate pressure, the compression ratio, the gas load simulation, the maximum and minimum working pressure, the electrical power consumption, the residual gas analysis, and the acoustical noise and mechanical vibration levels, etc. More than one hundreds of vacuum pumps supplied to the semiconductor manufacturers have been tested so far. Their test results have provided the inventors with the systematic understanding about the key performance factors and dynamic characteristics of various vacuum pumps.

In order to obtain the pumping speed, this work used the throughput method which is the most widely used one for vacuum pumps and is applicable to the real working pressure operation ranges and pump capacities with sufficient accuracy.

Referring to FIG. 2, the square-marked, asterisk-marked and circle-marked lines denote the maximum, minimum and averaged pumping speed among the test results, which were obtained from the different gas load conditions simulated by controlling the internal gas pressure of the test dome shown in FIG. 1. The coefficient of variability for the pumping speed, which is defined by the ratio of the mean value to the standard deviation, was observed to be 6.7% at the internal pressure of test dome equal to 0.01 [mbar] and 5.0% at the pressure of 0.02 [mbar], respectively. Over the higher level than 0.05 [mbar], the coefficients of variability were seen to be equal to or less than 3.5%. It means that the pumping speed for the tested vacuum pumps is quite well quality-controlled within the small variability. It is important to see that the pumping speed with the small variability is a good performance indicator to judge what extent the current performance of the vacuum pump has been degraded so far. In real, the pumping speed is the most significant factor among the performance parameters of the low vacuum pump. This work suggests the use of the pumping speed as the novel state variable. But, the previous inventions for monitoring the operation conditions of vacuum pumps do not consider the pumping speed as the monitored state variable. In the next section, this work proposes a systematic way of evaluating the pumping speed indicator even in the pump-installed semiconductor fabrication site, that is the in-situ estimation method. The estimated pumping speed indicator is shown to play a critical role for the precision predictive maintenance of vacuum pumps since it enables pump maintenance engineers to determine a suitable time for pump replacement.

FIGS. 3a and 3b show what amount of variation of the acoustical noise and mechanical vibration levels exists among the tested pumps. Although their pumping speed has the small variability shown in FIG. 2, the acoustical noise and mechanical vibration levels are shown to be very different for each pump of the identical model. The acoustic noise level was estimated by averaging the measured sound pressures from the ten selected positions recommended by the ISO 3744 standard. The maximum difference in the acoustic noise level was observed to be 12 dBA at the test dome pressure of 2 [mbar]. At the other gas load conditions, the sound pressure level (SPL) difference was close to about 9 dBA. Such large SPL difference is equivalent to four times loudness difference (double loudness per 5 dBA SPL difference). The coefficient of variability for the sound pressure levels was fund to be 51%-65% over the pressure range of 0.01 [mbar] to 10 [mbar]. The coefficient of variability for the mechanical vibration (acceleration) levels was found to be 19%-23% below the pressure of 1 mbar and to increase to 51% as the gas pressure reaches to 10 [mbar]. Moreover, the ratio of the minimum to maximum levels for the mechanical acceleration levels were observed to be 1.4 to 1.6 below the gas pressure of 1 [mbar] but to increase rapidly to 3.3 as the gas pressure reaches to 10 [mbar]. Such large variability indicates that each individual pump has its own normal operation conditions for the acoustical noise and mechanical vibration. This pump-by-pump dependent operation characteristics has yielded much difficulty in using the fixed level-based threshold methods for generating the warning or alarm signal for the machinery operation monitoring systems because they have often led to unreliable and inconsistent state monitoring results, i.e. false warning or alarm signals even for the normally running machinery.

In order to improve such limited capability of the fixed level-based machine state monitoring and diagnosis systems, this invention will suggest an active algorithm in the next section that is self-adaptive to the pump-by-pump dependent normal operation conditions. As widely addressed in the conventional machinery health monitoring systems [Ref. 2], the mechanical vibration and acoustic noise signals are also exploited in this work to implement the fault detection of vacuum pumps, for instance the wear of such mechanical part as ball bearings, journal bearings, gears, pump lobes, seals, sizing of rotating elements, etc. Those mechanical faults are well diagnosed from the spectral analysis of the mechanical vibration and acoustic noise signals proposed in the previous work [Ref. 2]. Of course, the mechanical faults also enables pump maintenance engineers to determine a suitable time for pump replacement.

It should be noted that such gas-load dependent state variables of the machine operation monitoring systems are not limited to the acoustical noise and mechanical vibration signals. FIGS. 4a and 4b show the statistical characteristics (maximum, minimum and mean values) of the electrical power consumption values measured from the booster pump and the dry pump. The ratio between the minimum and maximum power consumption values for the booster pump was observed to be 1.3 below the gas pressure e of 2 [mbar] and to increase to 1.6 as the gas pressure reaches to 10 [mbar]. The coefficient of variability for the booster pump was seen to be 9%-11% below the gas pressure of 1 [mbar] but to increase steeply to 57% as the gas pressure reaches to 10 [mbar]. Unlike this large variability of the electrical power consumption for the booster pump, the ratio between the minimum and maximum power consumption values for the dry pump was observed to be 1.1-1.2 over the tested gas pressure range. The coefficient of variability was also seen to be 4%-6% over the tested gas pressure range. Those test results indicate that the total power consumption of the booster and dry pumps is a state variable with large variability such that the total power consumption value is ineffective for the state monitoring system. As a result, the two separated power consumption values for the booster and dry pumps are considered in the invention.

It is very important to understand what amount of measured state variables increases as the gas load conditions vary over the pump operation range. Experimental results shown in FIG. 3a, 3b, 4a and 4b help to find the answer to the question by observing carefully the mean values (denoted by the asterisk-marked solid lines). Although the test dome gas pressure gradually increases to some extent, the mean values remain even. It is a region where the measured state variables of the acoustical noise, mechanical vibration, and electrical power consumption levels are independent of the gas load. This invention does also exploit such gas load-independent characteristics for the measured state variables to diagnose the vacuum pump operation conditions. Such gas load-independent conditions are very often found in the real process conditions. A good example is an "idle" state of the running vacuum pump, that is the interval any external gas is not supplied to the pump inlet port. This invention in the next section will propose a systematic way of modeling the load-independent behaviors of the state variables for the vacuum pump monitoring and diagnostic system.

Furthermore, as the gas pressure increases above the gas load-independent region, the mean values of the acoustical noise, mechanical vibration, and electrical power consumption variables are shown to increase. For instance, the maximum acoustical noise level in the gas-load dependent region is shown to be 12 dBA (four times) higher than that in the gas load-independent one. Similarly, the maximum mechanical vibration level in the gas-load dependent region is shown to be 2.4 times higher and the electrical power consumption levels of the booster and dry pumps also to be 2.3 and 1.2 times larger, respectively. Here, another technical issue encountered firm the state monitoring and diagnostic systems is to find an adequate model for describing those gas load-dependent behaviors of the state variables since the real operation range of the vacuum pumps always include the gas load-dependent conditions. In the next section, this work will also propose a systematic way of modeling the dynamic characteristics of the state variables in the gas load-dependent region. Of course, a mathematically identical model is shown to be applicable to both gas load independent and dependent conditions. As a result, one model is dedicated for the gas load-independent running region and the other for the gas load-dependent one. The use of two separated models has been developed to improve the reliability and confidence for detecting possible abnormal running conditions of the vacuum pumps as early as possible.

It is obvious in this work that monitored information about the gas load conditions, i.e. the inlet gas pressure signals of the vacuum pump, should play an important role in distinguishing the abnormal running conditions of the vacuum pumps, more specifically judging whether the increase of monitored state variables are caused by the gas load or not. In order to improve the capability of diagnosing the abnormal running conditions of the vacuum pumps more reliably, the use of the monitored inlet gas pressure information has not been made in the previous inventions. In this work, the monitoring of the inlet gas pressure is shown to enable the quantitative analysis of the pumping speed, in addition to the improvement of the diagnosis capability. This point is invaluable since the evaluated pumping speed indicator leads to the determination of the suitable time when the vacuum pump of interest should be replaced by a new one. This invention presents a logical way of evaluating the pumping speed of the running vacuum pump in the semiconductor fabrication site. The estimated pumping speed indicator is shown to play a critical role for the precision predictive maintenance of vacuum pumps since it enables pump maintenance engineers to determine a suitable time for pump replacement.

Technical Solution

According to the present invention, there is provided a precision diagnostic method for the failure protection and predictive maintenance of a vacuum pump, comprising the steps of: 1) collecting various pump operation-related state variables of a newly installed vacuum pump with a sampling rate for the idle and different gas-loaded conditions; 2) determining the maximum and minimum values of the time series of said state variables from each set of consecutively sampled signals over the user selected period which should be longer than the dominant period of fluctuating state variable signal components for the idle and different gas-loaded conditions; 3) estimating the pump operation characteristic values using parametric model-based active diagnostic algorithms for the idle and different gas-loaded conditions; 4) evaluating the pump performance indicators of said newly installed vacuum pump using an in-situ evaluation method; 5) storing the estimated pump operation characteristic values and the evaluated pump performance indicators of said newly installed vacuum pump in the vacuum pump maintenance database; 6) repeating the steps from 1) to 5) whenever the said newly installed vacuum pump is monitored to be under an abnormal operating condition; and 7) comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

According to the present invention, there is also provided a precision diagnostic system for the failure protection and predictive maintenance of vacuum pumps, comprising: a dedicated signal conditioning unit for amplifying the inlet and exhaust pressure transducers, supply current probes to the booster and dry pumps, mechanical vibration sensors and measurement microphones installed at the middle of the booster and dry pumps; a high-speed, multi-channel data acquisition (DAQ) system adequate for collecting the mechanical vibration and sound pressure signals with very high frequency components up to 10~20 kHz; and a dual-processed sever-class PC system with the sufficient performance capacity of 1) collecting the sampled data of all measured state variables from the DAQ system in a real-time without any loss of data transfer; 2) evaluating the root-mean-square values of the mechanical vibration and sound pressure signals; 3) determining the time series of the maximum and minimum values of said measured state variables from each set of consecutively sampled signals for the idle and different gas-loaded conditions; 4) estimating the pump operation characteristic values comprising the best-fitted model parameters and the mean and peak values of said measured state variables using parameter model based active diagnostic algorithms; 5) and evaluating the pump performance indicators of the newly installed vacuum pump using an in-situ evaluation method; and storing the pump operation characteristic values and the pump performance indicators of the newly installed vacuum pump in the vacuum pump maintenance database; and comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

ADVANTAGEOUS EFFECTS

The most challenging issues in this work have been to find systematic ways of enabling maintenance engineers to decide an adequate time for the replacement of vacuum pumps on the basis of their current performance assessment results.

As described in Technical Problem Section, the performance test results of the large number of low vacuum pumps have led this invention team to confirm that they cannot be solved without tackling the two fundamental issues: The first is to improve the low-leveled reliability and consistency of the diagnostic results of the measured state variables mainly caused by the different pump-by-pump operation characteristics and the multiple process conditions. The second is to realize the field (or in-situ) performance test of low vacuum pumps in the installed site, not in the well-equipped test laboratory.

To approach the first issue, the linear parametric model-based active algorithm is proposed. The linear parametric model is considered to describe the asymptotic upper and lower bounds of the dynamic (fluctuating amplitude) characteristics imbedded in the measured state variables. The proposed active algorithm is shown to present the best fitted model parameters to the different vacuum pump operation conditions (i.e. the multiple process conditions) as well as the pump-by-pump dependent operation characteristics (i.e. the large variability of the vacuum pump operation features). Detailed digital signal processing schemes are proven to be very successful in estimating the vacuum pump operation characteristic values from the measured signals of the six state variables installed in the semiconductor process.

To resolve the second issue, this work proposes a simplified version of the pump-down test method developed to evaluate the vacuum pump performance for the precision diagnostic analysis needed for the predictive maintenance of low vacuum pumps. The proposed field performance evaluation schemes, referred to as the in-situ performance evaluation methods, consist of the simulated gas-loaded field tests under the close conditions to the real process and the evaluation of the four pump performance indicators for each gas-load dependent test condition. As in the same way as the evaluation of the operation characteristic values, the pump performance indicators are evaluated for each gas-loaded and idle operation condition. It is obviously shown that this work exploits the combined evaluation results of the evaluated operation characteristic values of each measured state variable and the pump performance indicators to carry out the precision diagnostic analysis for the predictive maintenance of vacuum pumps. The combined evaluation results obtained from the newly installed vacuum pump is illustrated in details in Best Mode Section, which are used as the initial (or reference) data set of the tested vacuum pump for its precision diagnostic analysis to come in the future.

Further, the feasibility and effectiveness of the in-situ vacuum pump performance evaluation schemes developed for the precision analysis of the predictive maintenance of vacuum pumps is examined by applying them to the vacuum pump that had reached to an extraordinary operation condition, that is 'slowly responding' to the desired vacuum level of the reaction chamber. The operation characteristic values and the pump performance indicators evaluated from the extraordinary operation condition are in details introduced in Best Mode Section. The comparison of the currently evaluated diagnostics analysis results and the initial (or reference) data set is shown to enable maintenance engineers to decide the replacement of the considered vacuum pump according to the evaluated pump performance indicators. More specifically, the evaluated pumping speed indicator of the current vacuum pump is reported to decrease up to 31%. This quantitative diagnostic analysis result is expected not only to enable maintenance engineers to decide an adequate time for the replacement of vacuum pumps on the basis of their current performance assessment results but also to improve the reliability and confidence of the predictive maintenance of low vacuum pumps.

It should be noted in this work that the measured inlet pressure signal as the reference state variable plays a central role in evaluating the proposed pump performance indicators. It is shown not only to enable the estimation of the pumping speed indicator but also to lead to the quantitative analysis of the gas-load dependent operation characteristics defined by the other three performance indicators related to the exhaust pressure, the supply currents to the booster and dry pumps. Furthermore, the inlet pressure signal is also exploited as the reference state variable to separate the current pump operation condition into the gas-loaded or idle running state. The two separated sets of the operation characteristic values, i.e. the one estimated under the idle operation condition of the vacuum pump and the other estimated under the gas-loaded operation condition. The reason is it that the measured signals of the state variables under the two operation conditions have quite different statistical characteristics and that the separated trend monitoring and diagnostic analysis for the idle and gas-loaded operation conditions is chosen to realize much improved performance for the early detection of vacuum pump failure. This work also proposes a logical way of constructing the series of the operation characteristics values evaluated from each measured state variable into the matrix-typed data suitable for the multi-variable statistics analysis, the capacity analysis and the Mahalanobis distance analysis. The transplantation of the model parameter structured data matrixes to such conventional analysis algorithms (the multi-variable statistical analysis, the process capability analysis, and the Mahalanobis distance analysis) is surely one of the main achievements contributed by this work. The proposed active diagnostic algorithms was developed not only to realize the early detection of degraded vacuum pumps for the protection of pump failure but also to provide their predictive maintenance.

Finally, this work proposes the real implementation system for the precision diagnostic analysis for the predictive maintenance of low vacuum pumps. The implementation system is shown to include the six ends of state variable measurement sensors, their corresponding signal conditioning amplifiers, the 16-channel high-speed data acquisition system, and the server-class PC system. As illustrated in Best Mode Section, the developed implementation system is well demonstrated to be so successful for the precision diagnostic analysis for the predictive maintenance of low vacuum pumps and a compact version of the implement system, which is portable and easily movable in the real process sites, can be applied.

BRIEF DESCRIPTION OF THE DRAWINGS

FIG. 10 shows the inlet pressure signals of the negative-going transition region between the gas-loaded operation region and the idle region shown in FIG. 9a;

BEST MODE FOR CARRYING OUT THE INVENTION

Figure 1:
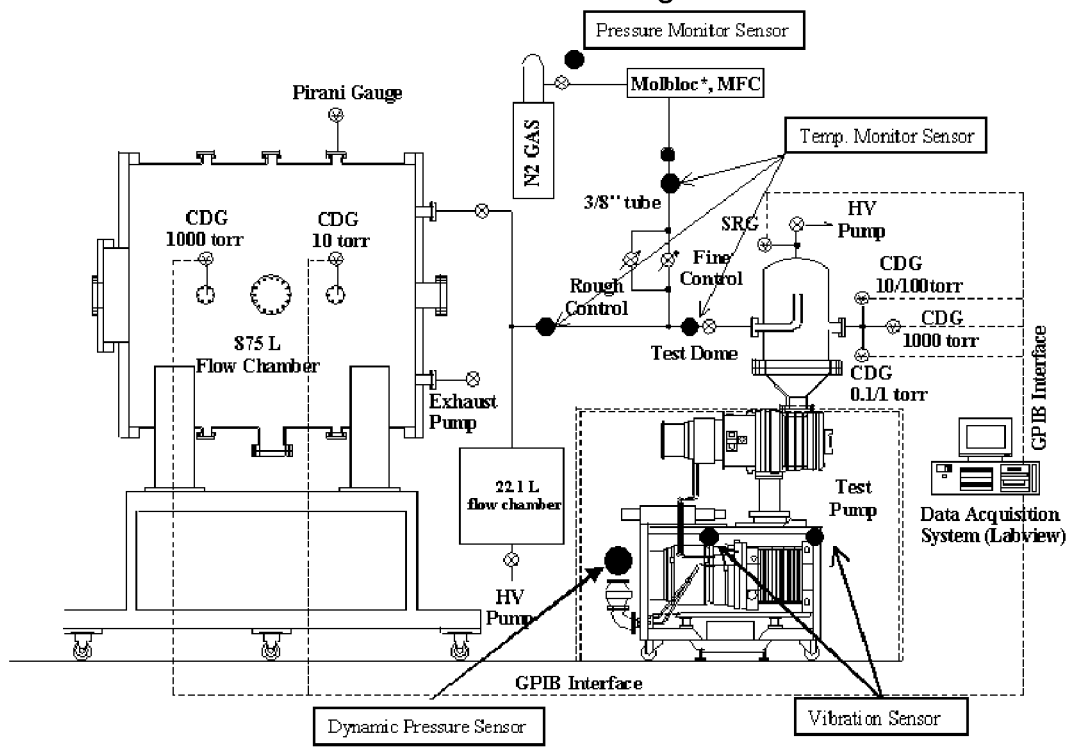
FIG. 1 is a schematic drawing of the performance test bench of low vacuum pumps of the present invention.
Figure 2:
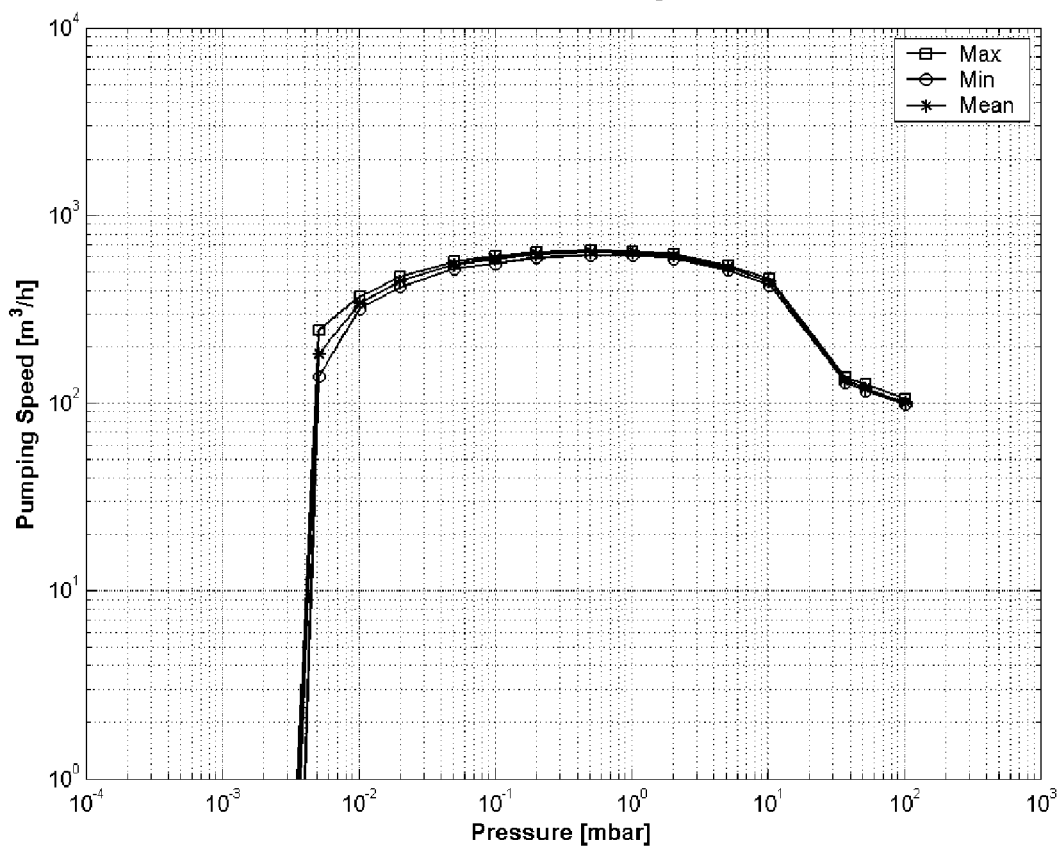
FIG. 2 shows a statistical characteristics for the pumping speed of low vacuum pumps.
Figure 3A:
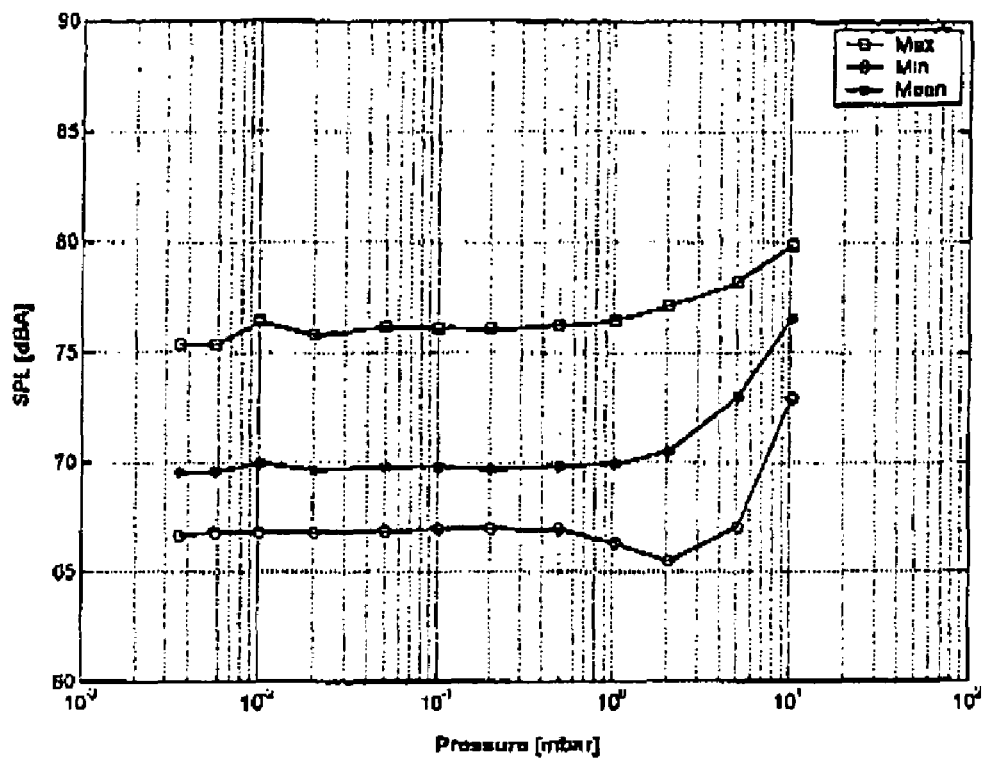
FIGS. 3a and 3b show spatially averaged acoustic noise levels characteristics of low vacuum pumps and mechanical vibration levels characteristics of low vacuum pumps, respectively.
Figure 3B:
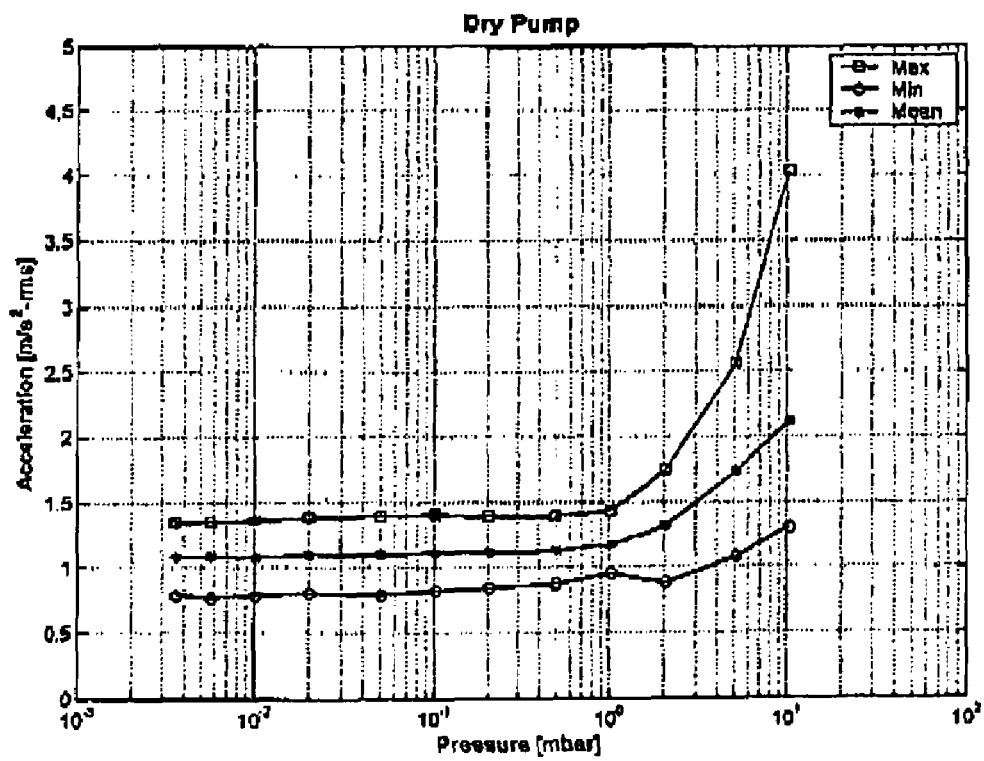
Figure 4A:
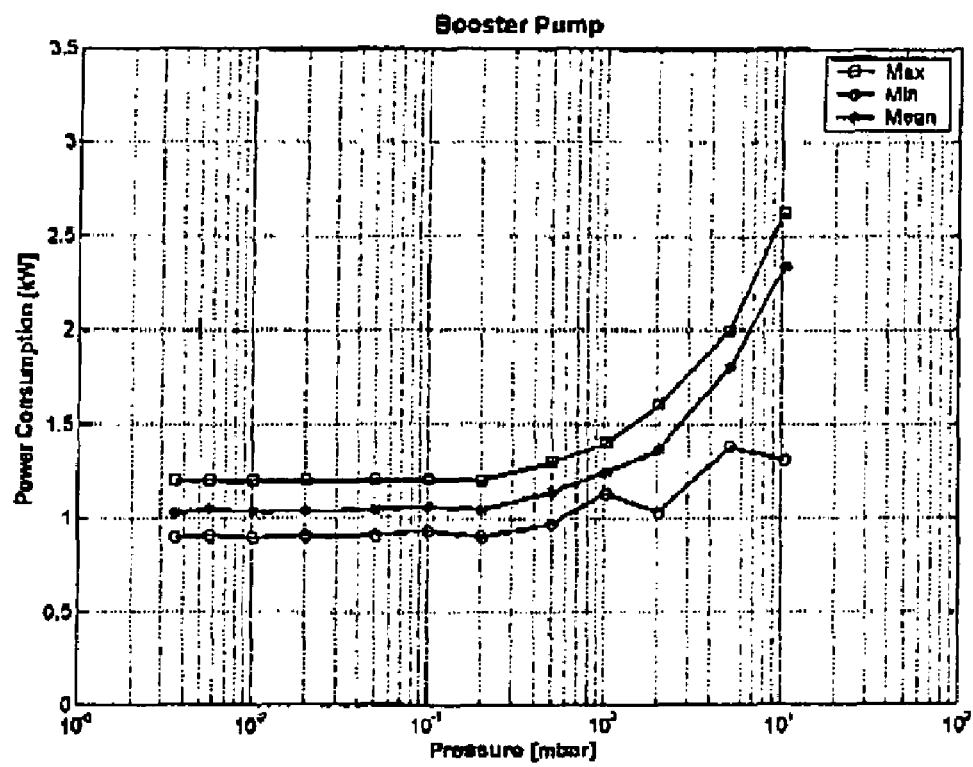
FIGS. 4a and 4b show characteristics of electrical power consumption of booster pumps and characteristics of electrical power consumption of dry pumps, respectively.
Figure 4B:
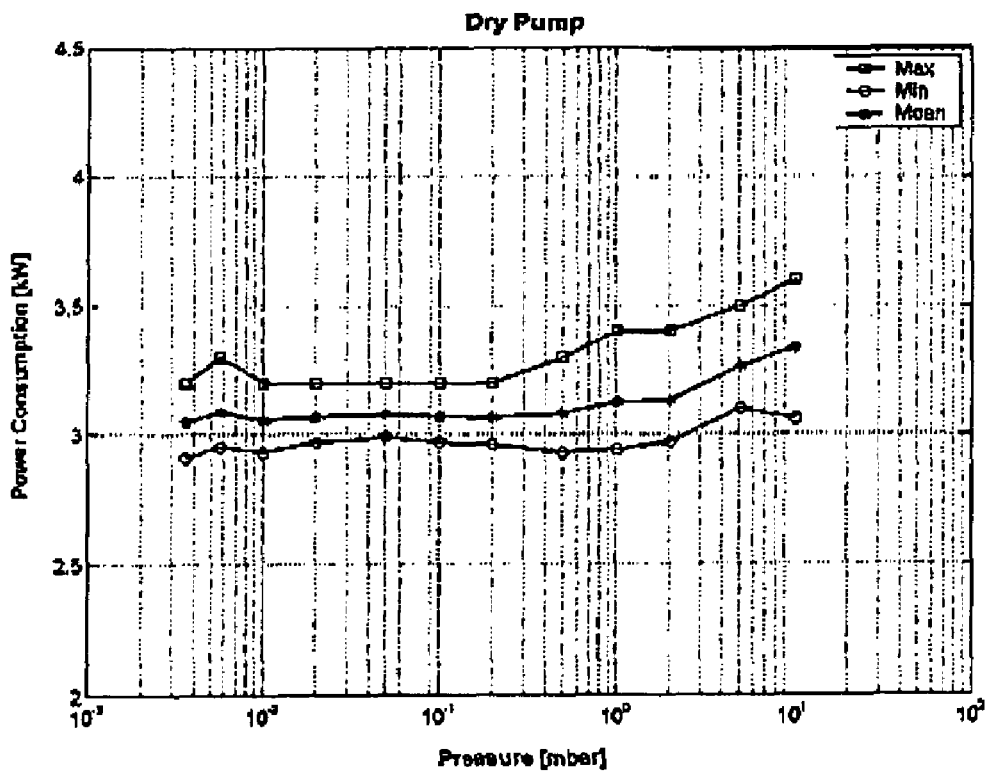

Precision Methods for the Predictive Maintenance of Low Vacuum Pumps

It is very often observed from the semiconductor fabrication plants that most maintenance engineers have much difficulty in judging an adequate time for the replacement of low vacuum pumps whenever the warning or alarming signals are issued by the low vacuum pumps. The reason it that the early detected warning or alarming signal does not always indicate the due time to replace the warning or alarming signal-issued pump. No maintenance engineer can replace the signal-issued pump by a new one without technical information about its detailed performance assessment results. But, the previous monitoring and/or diagnostic systems do not provide any systematic way of assessing the performance indicators of the vacuum pumps running at the warning or alarming-leveled condition. It became apparent that a modified version of the pump performance tests is not prohibited even in the pump-installed site although it does not fully satisfy all the requisites of the international standards for the performance tests of low vacuum pumps as illustrated in previous section. This work proposes the 'in-situ' ways to evaluate the performance indicators of the vacuum pumps installed in the semiconductor fabrication sites.

This work regards as the "normal" (or "initial") operation condition the running state of a new or reconditioned vacuum pump that has finished the warming-up procedures after the site installation. It is certain that the evaluated performance indicators at the initial condition are very useful since they enable maintenance engineers to judge what extent of the running condition differs from the initial one, for instance on the moment the warning or alarming signal is monitored. When a new or reconditioned pump is ready for the normal operation, this work proposes to carry out its performance tests for the different gas-loaded conditions, such as the 25%, 50%, 75%, and 100% levels of the maximum reaction chamber pressure expected for the real processes. When the detailed chamber pressure levels are available from the process recipes, they are also selected for gas-loaded conditions of the gas load-dependent performance tests. The identical gas loaded tests to the process conditions are expected to be the best choice since the characteristics of the state variables for the initial operation condition are also use for the trend monitoring and diagnostic analysis of the considered pump. Instead of real process gases, the nitrogen gas is also recommended since it is used for the nominal performance tests of low vacuum pumps. It should be noted that the initial gas-loaded performance tests are used not only to evaluate the gas load-dependent performance of a newly installed vacuum pump but also to obtain the dynamic characteristics of the initial state variables. This work also exploits the characteristics of the initial state variables measured from the gas-loaded operation conditions to judge what extent of the running condition differs from the initial one, for instance on the moment the warning or alarming signal is monitored. In order to realize the precision diagnostic analysis for the predictive maintenance of low vacuum pumps, both the dynamic characteristics of the state variables and the evaluated performance indicators are considered in this work In order to describe accurately the dynamic characteristics imbedded in the measured state variables, the parametric model-based active algorithm, as well known in the digital signal processing and control theory [Reference 16: B. Widrow and S. D. Steams, Adaptive Signal Processing, Prantice-Hall, Englewood Cliffs: NJ, 1985; Reference 17: P. A. Nelson and S. J. Elliott, Active Control of Sound, Academic Press, London, England, 1992], is chosen. The active algorithm enables the estimation of the model parameters well adjusted to the dynamically varying state variables. The estimated model parameters are exploited to diagnose the vacuum pump running conditions, that is to judge quantitatively what extent of the running condition differs from the initial one. This theoretical approach is referred to the "active diagnostic" algorithm in this invention. The active diagnostic algorithm has been a key content of the international patent pending in the name of same inventors, which is also exploited in this work. It is significant to note that the active algorithm provides the set of the model parameters tuned to the different pump operation conditions, i.e. multiple process conditions. Of course, it still enables the estimation of the model parameters even for the different pumps. A set of these pump dependent parameters is extremely useful to examine the operation variability for a group of same model vacuum pumps. It is the reason to use the parametric model-based active algorithm for the diagnosis of the vacuum pumps.

1. Active Algorithm for Parametric Modeling of Diagnostic State Variables

A state variable in this invention is defined as one of periodically sampled physical properties selected to examine quantitatively the operation conditions of a considered vacuum pump. There are various pump operation-related state variables such as the inlet and exhaust pressures, the motor supply currents to the booster and dry pumps, the mechanical vibration signals, the sound pressure signals, the purge gas pressure and its flow rate, the body temperatures, the cooling water temperature, the lubrication oil pressure and level of the dry pump, etc. The first step for the predictive maintenance of vacuum pumps is to collect the initial data sets representative for the dynamic characteristics of those state variables for the different gas-load conditions. To collect them, the newly installed vacuum pump ready for the normal operation was selected. The required process gas load levels for the vacuum pump were found to correspond to the two inlet pressure levels of 10 [mbar] and 14 [mbar], respectively. The performance test results obtained from the two different gas-loaded conditions are illustrated in this section.

Figure 5A:
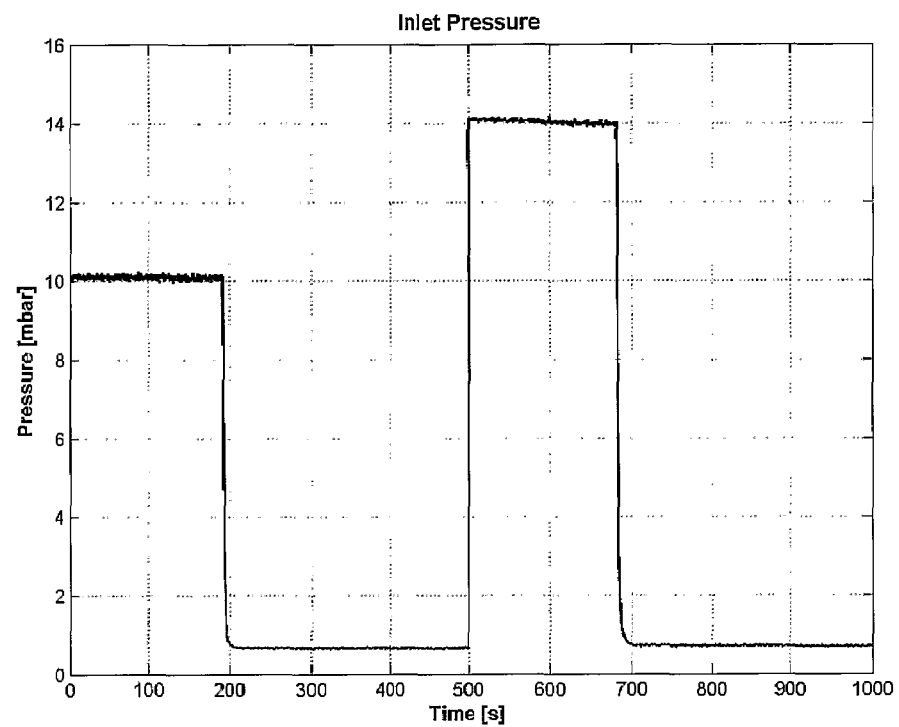
FIGS. 5a to 5d show measured state variable signals, the inlet and exhaust pressures and the supply currents of the booster and dry pumps, respectively.
Figure 5B:
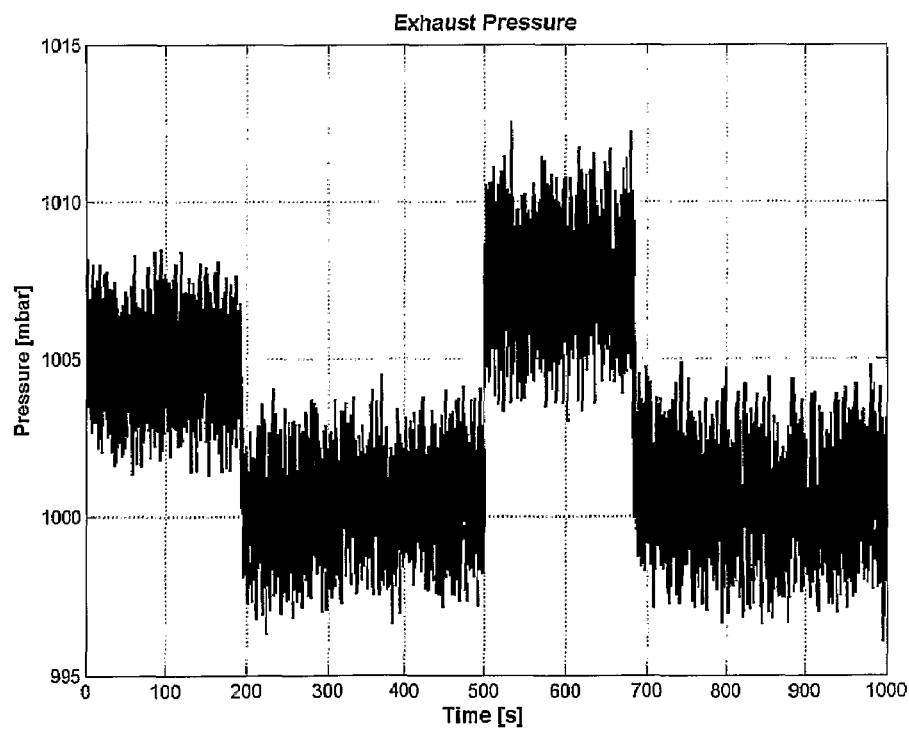
Figure 5C:
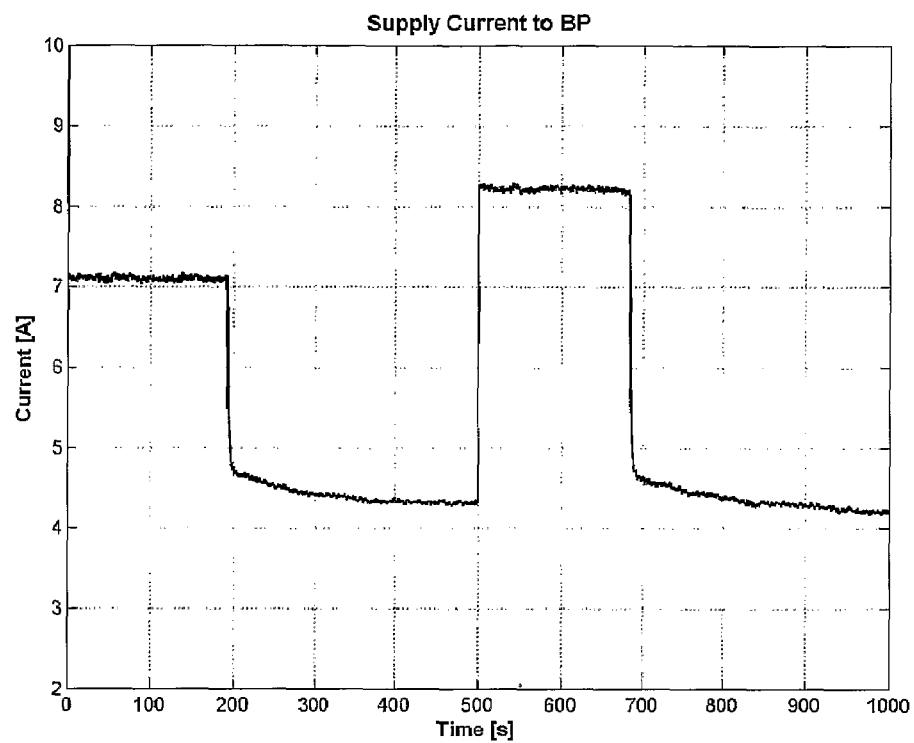

FIG. 5a to 5d illustrate the measured state variable signals, (a) the inlet pressure, (b) exhaust pressure, (c) the supply current of the booster pump and (d) the supply current of the dry pump, respectively, which were sampled at the rate of 10 words per second. As shown in FIG. 5a, the two different inlet pressure levels are well matched with the desired ones. The two high amplitude-leveled regions correspond to the pumping state. The base pressure level of the inlet port corresponds to the "idle" operation state of the vacuum pump to which any pumping gas is 'minimally' supplied externally from the process chamber. It is obviously seen from FIGS. 5b, 5c, and 5d that the exhaust pressure and the supply currents to the booster and dry pumps depend on the inlet pressure levels, i.e. the gas-loaded conditions. They are the good examples of the gas load-dependent state variables. A fundamental question here is how to describe the dynamic characteristics observed from the gas load-dependent state variables. The observation of the illustrated dynamic characteristics in FIGS. 5a to 5d has led to the choice of a parametric model in this work. To describe the range of fluctuating amplitude signals, the upper and lower asymptotic curves are considered in this work. This amplitude-range modeling method has already proven to be very effective for the trend monitoring and diagnostic analysis of vacuum pumps, as demonstrated in the previous invention [18]. In order to clarify the main contents of this invention, the implementation schemes of the amplitude range modeling method are rephrased in this section.

Let ym denote the m-th sampled inlet pressure signal and the subscript m denote the time index. In this work, the sampling rate was chosen to be 10 Hz (10 samples per second). The sampled time series {ym: m=1, 2, . . . } of each measured state variable, as shown in FIGS. 5a to 5d, are used to sort out the minimum and maximum values over the user selected period, i.e. every 20 second, which can be selected to be longer than the period of the slowly fluctuating signal, i.e. the DP (dry pump) supply current shown in FIG. 5d.

Figure 5D:
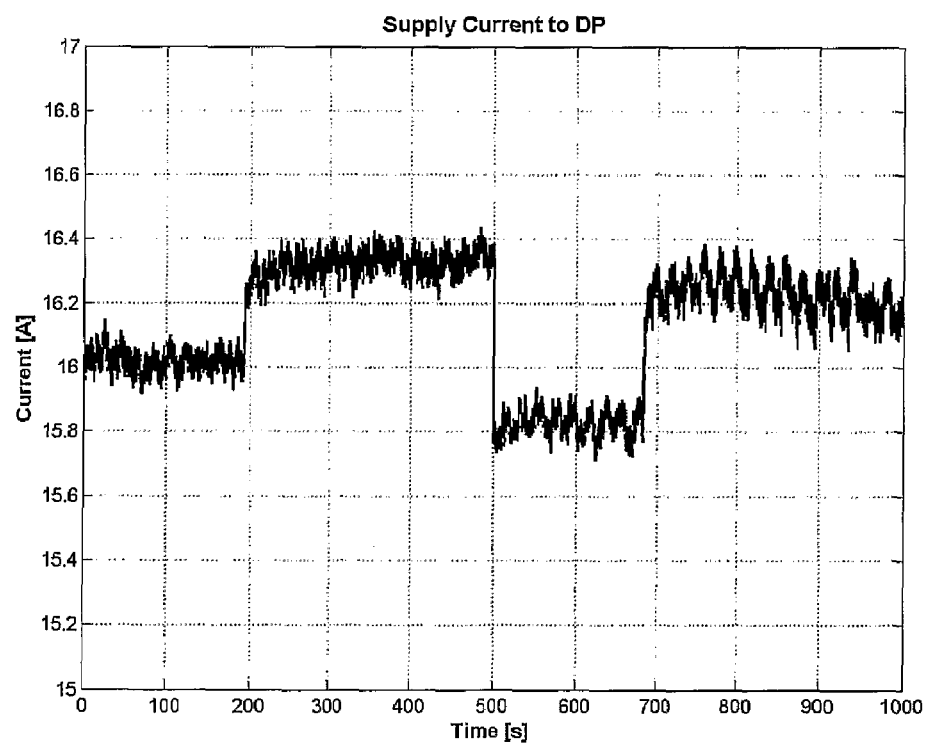

The dominant period of fluctuating DP supply current signals, shown in FIG. 5d, was found to be close to 20 seconds by using the FFT (fast Fourier transform) analysis. As a result, each sorting of the maximum and minimum values was carried out each 20-second recorded signal. The latter half (50%) of the 20-second recorded signal was overlapped for the next sorting such that each set of maximum and minimum values was obtained every 10 second. In this work, the mean value for the 20-second recorded signal was additionally evaluated to examine how far it is from the sorted maximum and minimum values. Furthermore, a peak value during every idle or gas-loaded operation was also searched. The peak values corresponding to the repeated idle and gas-load conditions are used to examine what amount of unexpected variation of each state variable occurs for each idle or gas loaded operation.

FIG. 6a to 6d illustrate the comparison of the sorted maximum and minimum values (thin solid lines) and the fitted model-based estimation results (thick solid lines) for (a) the inlet pressure signal, (b) the exhaust pressure signal (c) the supply current signal of the booster pump and (d) the supply current signal of the dry pump. The circle symbols on the thin-solid lines indicate the peak values for the idle and gas-loaded operation conditions.

The sorted maximum and minimum values are shown in FIG. 6a to 6d. Let the maximum and minimum values of the inlet pressure signals be {yU,n, yL,n: n=1, 2, . . . } that is obtained from each set of consecutively sampled signals for the first gas loaded operation interval. This work proposes a linear model for describing the upper and lower asymptotic curves, which is given as $$y_{k,n} = a_k \cdot n + b_k \qquad \text{MathFigure 1}$$

In equation (1), the subscript k denotes the upper or lower asymptotic models, i.e. k=U for the upper asymptotic model and k=L for the lower asymptotic model. In equation (1), the two sets of model parameters {$a_k$, $b_k$:k=U or L} are readily obtained by using the least squares method. Let the time series of the maximum and minimum values sorted for the first gas-loaded state be {$y_{k,n}$:n=1, 2, . . . , N}. The best-fitted model parameters are obtained as follows:

$$a_k = \frac{N \cdot \sum_{n=1}^{N} n \cdot y_{k,n} - \sum_{n=1}^{N} n \cdot \sum_{n=1}^{N} y_{k,n}}{N \cdot \sum_{n=1}^{N} n^2 - \left(\sum_{n=1}^{N} n\right)^2}, \qquad \text{MathFigure 2}$$

$$b_k = \frac{\sum_{n=1}^{N} n^2 \cdot \sum_{n=1}^{N} y_{k,n} - \sum_{n=1}^{N} n \cdot \sum_{n=1}^{N} n \cdot y_{k,n}}{N \cdot \sum_{n=1}^{N} n^2 - \left(\sum_{n=1}^{N} n\right)^2}$$

The first parameters {$a_k$: k=U or L} in equation (2) are the slop of the inlet pressure signal that indicates the increasing or decreasing rate. The second parameters {$b_k$: k=U or L} indicate each initial inlet pressure levels (i.e. at n0). The thick solid lines in FIG. 6a to 6d illustrate the evaluated values from the fitted models for the upper and lower asymptotic curves. The estimated upper and lower asymptotic curves are shown to be well fitted for the upper and lower bounds of measured amplitude signals. Furthermore, the estimated model parameters can be used to examine what amount of variation of the inlet pressure exists for the first gas-loaded operation condition. It indicates that the trend of the inlet pressure can be quantitatively characterized by the estimated model parameters. This point is invaluable since only the two sets of fitted model parameters enables the trend monitoring and diagnosis for the measured inlet pressure conditions. The use of the fitted model parameters provided much memory saving for the trend monitoring and diagnosis system since the proposed approach does not use a full set of sampled time series. It means that a compact hardware based implementation system is realizable by using the fitted model parameters. It should be noted that the mean value and the standard deviation for each upper or lower asymptotic curve are also obtained by using the following equation.

$$y_{k,mean} = \frac{N+1}{2} \cdot a_k + b_k, \qquad \text{MathFigure 3}$$

$$\sigma_k = a_k \cdot \sqrt{\frac{1}{N} \cdot \sum_{n=1}^{N} (y_{k,n} - a_k \cdot n - b_k)^2} \quad \text{for } a \neq 0$$

$$y_{k,mean} = b_k,$$

$$\sigma_k = \sqrt{\frac{1}{N} \cdot \sum_{n=1}^{N} (y_{k,n} - b_k)^2} \quad \text{for } a = 0$$

Figure 6A:
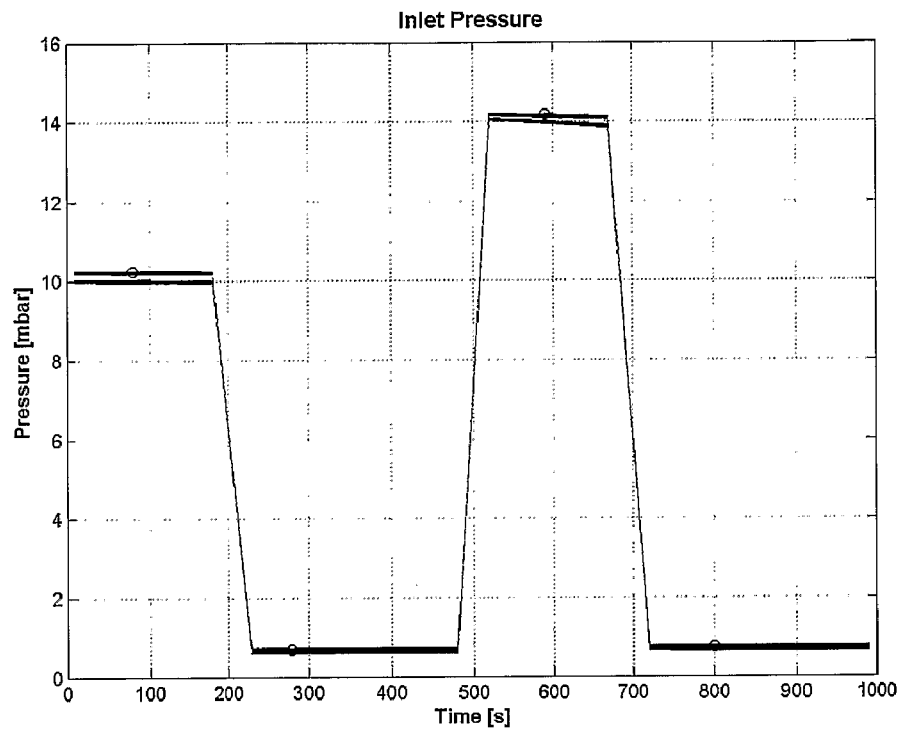
FIG. 6a to 6d show comparison of the sorted maximum and minimum values (thin solid lines) and the fitted model-based estimation results (thick solid lines) for the inlet and exhaust pressure signals and the current signals of the booster and dry pumps, respectively.

In case of zero valued slop (a=0 in equation (3)), the second parameter is shown to be the mean value. As shown in equation (3), the estimated parameters enable not only the calculation of the statistical properties (the mean and standard deviation values) regarding the estimated models. It reveals the usefulness and effectiveness of using the parametric model that is adjustable to the statistical characteristics of measured state variables. As shown in FIG. 5(a), the magnitude of the inlet pressure looks flat but a small amount of fluctuation is seen to exist when the scale of the even amplitude level zones is zoomed out. As shown in FIG. 6a, the estimated model parameters are shown to be sufficient to examine how well the inlet pressure is maintained under the gas-loaded condition.

Given the time series of the sorted maximum and maximum values of the sampled inlet pressure signals for the first idle state, the two sets of the upper and lower model parameters are obtained by suing equation (2). The mean value and the standard deviation for each asymptotic curve are also obtained from the equation (3). The estimated parameter sets are also shown to provide enough information to judge what extent of the vacuum level at the inlet port of the tested pump is kept up. Similarly, the model parameters of the upper and lower asymptotic curves for the other idle and gas-loaded conditions are estimated. The fitted model parameters and their statistical properties estimated in the idle and gas-loaded operation conditions are used for the predictive maintenance of vacuum pumps. The combined parameter sets of the idle and gas-loaded operation conditions are very useful to examine not only what amount of gas load conditions is exerted upon the vacuum pump but also what extent of vacuum level in the idle states is maintained. The knowledge of the gas loading conditions to the vacuum pumps will be shown to play a critical role in judge an adequate time for the replacement of the vacuum pump under the abnormal operation conditions. This work puts much emphasis on the use of the inlet pressure signal for the precision diagnosis of vacuum pumps specifically used in the semiconductor fabrication processes.

Figure 6B:
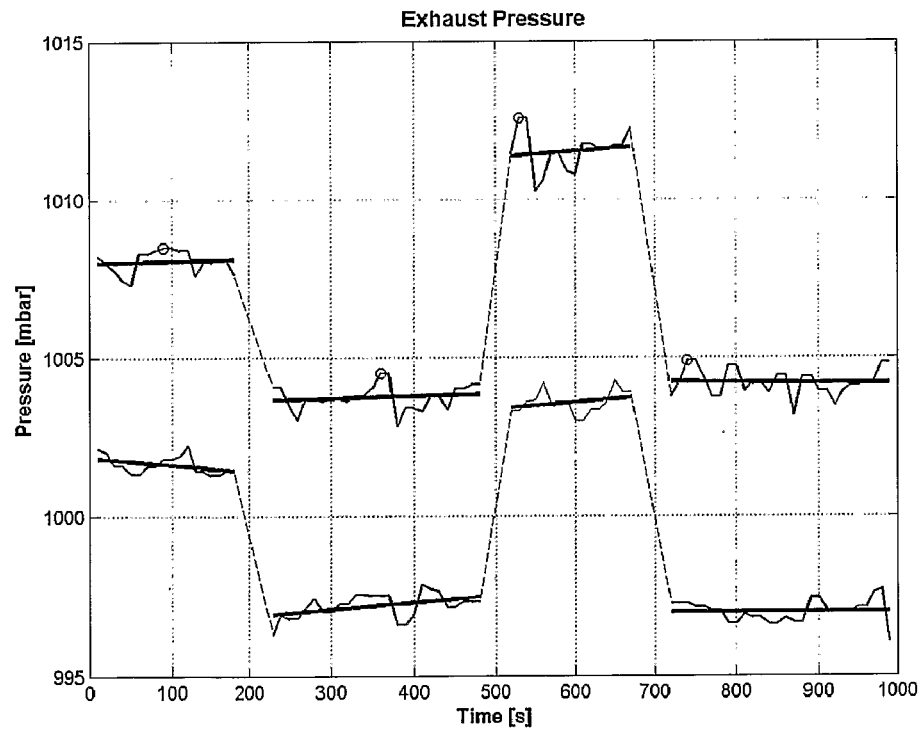
Figure 6C:
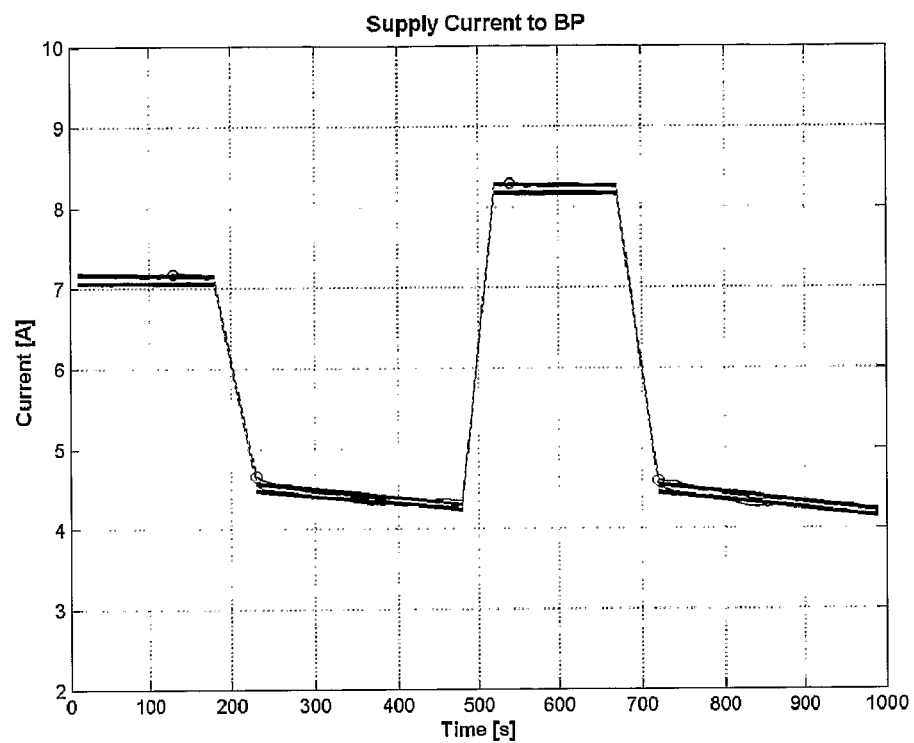
Figure 6D:
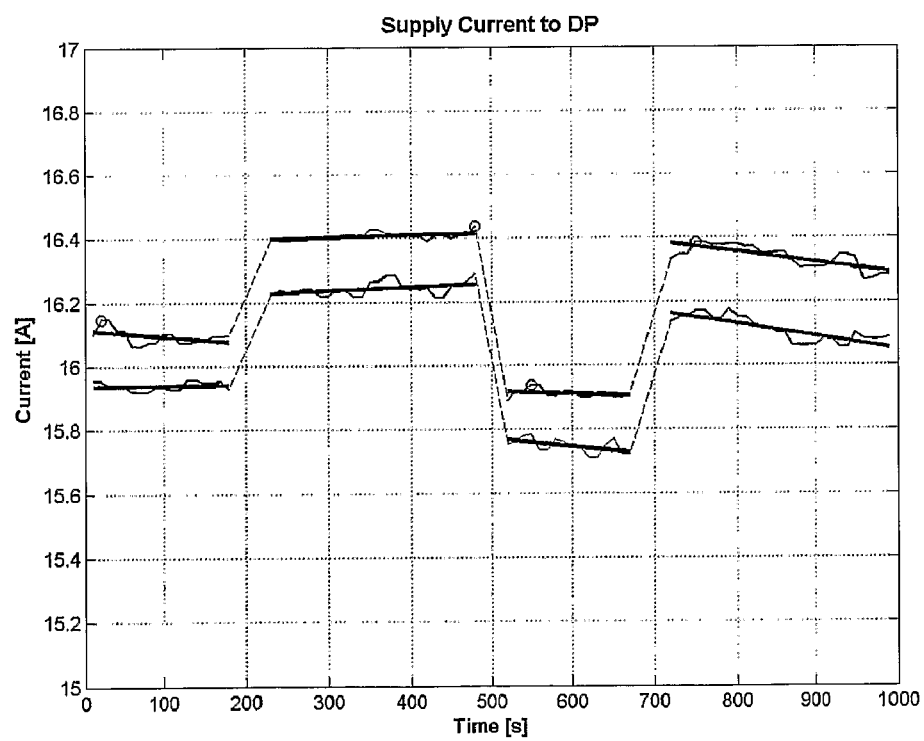

The theoretical background of the parametric model, selected to describe the dynamic behaviors of the inlet pressure signals observed from the vacuum pumps, has been addressed so far. That approach is also applicable to other state variables such as the exhaust pressure signals and the supply current signals of the booster and dry pumps shown in FIG. 5b, 5c and 5d. The time series of the maximum and minimum values for each state variable are readily obtained by sorting out the maximum and minimum values from every block of consecutive 200 samples (equivalent to the 20-second recorded signal) supplied from the data acquisition system. FIG. 6b, 6c and 6d illustrate the time series of the sorted maximum and minimum values (the thin solid lines) and fitted model-based estimation results (the thick solid lines) for the exhaust pressure signals and the current signals supplied to the booster and dry pumps, respectively. Given the sorted time series of each state variable for the idle and gas loaded operation conditions, the two parameters sets corresponding to the upper and lower bounds are obtained by using equation (2). The estimated parameters sets of the upper and lower bounds are also used to examine what amount of the variation of each state variable is kept up under the repeated idle and gas-loaded operation conditions.

From FIGS. 5a to 5d and 6a to 6d, the pump performance test carried out during 1000 seconds is seen to consist of four operation steps, i.e. the two different gas-loaded operation conditions and the two idle ones.

Table 1 shows the evaluated operation characteristic values for the four state variables (the inlet and exhaust pressure signals and the supply current signals of the booster and dry pumps). Note that BP and DP denote the booster and dry pumps and that $a_U$ and $b_U$ denote the slop and initial values of the asymptotic upper bound curves and $a_L$ and $b_L$ do the slop and initial values of the asymptotic lower bound curves.

gas loaded operation. Note that transient states between the idle and gas-loaded states were not used for the parameter estimation as specified in the time interval (i.e. the third raw of Table 1). The six operation dependent characteristic values are separately evaluated for each idle or gas-loaded operation state (i.e. step 1 to step 4 in Table 1). They are actually used to examine what extent the current state variable is deviated from the initial operation condition. Since the performance test results in Table 1 were obtained from the newly installed vacuum pump ready to pump out the product gases they are regarded as the 'reference' values to be used for the diagnosis of the vacuum pump. As the normal performance test procedures of vacuum pumps, repeated performance tests under the same gas-loaded conditions are recommended since they enable the estimation of the more reliable test results in a statistical sense.

It is shown in this work that the evaluation of the operation characteristic values is made for the two separated idle and gas-loaded operation regions. As in FIGS. 5a to 5d and 6a to 6d, the upper and lower bound levels of the four state variables, the inlet and exhaust pressures and the supply currents of the booster and dry pumps, are obviously dependent on the gas-loading conditions. Those mechanical and electrical state variables are generally regarded to be a class of static properties. Unlike those static properties, the mechanical vibra-

TABLE 1

| Pump Operation Conditions | | | Step 1 Gas-Loaded State 1 0~190 [s] | Step 2 Idle State 1 220~490 [s] | Step 3 Gas-Loaded State 2 510~680 [s] | Step 4 Idle State 1 710~1000 [s] |
|---|---|---|---|---|---|---|
| Inlet Pressure [mbar] | | Mean Value | 10.1 | 0.66 | 14.0 | 0.70 |
| | Upper Bound | $a_U$ | −0.001 | −0.0002 | −0.0049 | −0.0005 |
| | | $b_U$ | 10.2 | 0.69 | 14.1 | 0.73 |
| | | Peak Value | 10.2 | 0.70 | 14.2 | 0.74 |
| | Lower Bound | $a_L$ | −0.0021 | −0.0005 | −0.011 | 0.0005 |
| | | $b_L$ | 10.0 | 0.64 | 14.0 | 0.68 |
| Exhaust Pressure [mbar] | | Mean Value | 1004.9 | 1000.3 | 1007.4 | 100.3 |
| | Upper Bound | $a_U$ | 0.0051 | 0.0071 | 0.0184 | −0.0023 |
| | | $b_U$ | 1008.0 | 1003.4 | 1011.4 | 1004.2 |
| | | Peak Value | 1008.5 | 1004.5 | 1012.6 | 1004.9 |
| | Lower Bound | $a_L$ | 0.024 | 0.0215 | 0.02 | 0.0002 |
| | | $b_L$ | 1001.8 | 996.9 | 1003.4 | 997.0 |
| BP Supply Current [A] | | Mean Value | 7.11 | 4.40 | 8.22 | 4.34 |
| | Upper Bound | $a_U$ | −0.0014 | −0.0106 | −0.0013 | −0.0122 |
| | | $b_U$ | 7.17 | 4.57 | 8.28 | 4.55 |
| | | Peak Value | 7.18 | 4.65 | 8.19 | 4.59 |
| | Lower Bound | $a_L$ | −0.0001 | −0.0092 | −0.0006 | −0.011 |
| | | $b_L$ | 7.06 | 4.47 | 8.17 | 4.45 |
| DP Supply Current [A] | | Mean Value | 16.0 | 16.3 | 15.8 | 16.2 |
| | Upper Bound | $a_U$ | −0.002 | 0.0006 | −0.0008 | −0.0034 |
| | | $b_U$ | 16.1 | 16.4 | 15.9 | 16.4 |
| | | Peak Value | 16.2 | 16.4 | 15.9 | 16.4 |
| | Lower Bound | $a_L$ | 0.0003 | 0.0011 | −0.0027 | −0.004 |
| | | $b_L$ | 15.9 | 16.2 | 15.8 | 16.2 |

It is obvious from Table 1 that the characteristics of each state variable are described by eight parameters: two time-stamps (initial and final time), four model parameters (the pair of the slop and initial values) for the upper and lower asymptotic curves, and the mean and peak values, respectively. They inform when the idle or gas-loaded state occurs and what extent of the inlet gas pressure under the idle or gas-loaded state varies between the upper and lower bounds. The mean values are used to check whether each state variable remains in the desired level under the stationary operation. The peak values are used to examine what amount of unexpected variation of each state variable occurs for each idle or tion and acoustical noise signals that include high frequency components have been used as the state variables for the trend and diagnostic analysis.

FIGS. 7a to 7d illustrate the root-mean-squared (rms) levels of the vibration acceleration and acoustical noise signals and their asymptotic upper and lower bound curves (thick solid lines) and the "circle" symbol denotes the peak value for each gas-loaded or idle operation condition.

Figure 7A:
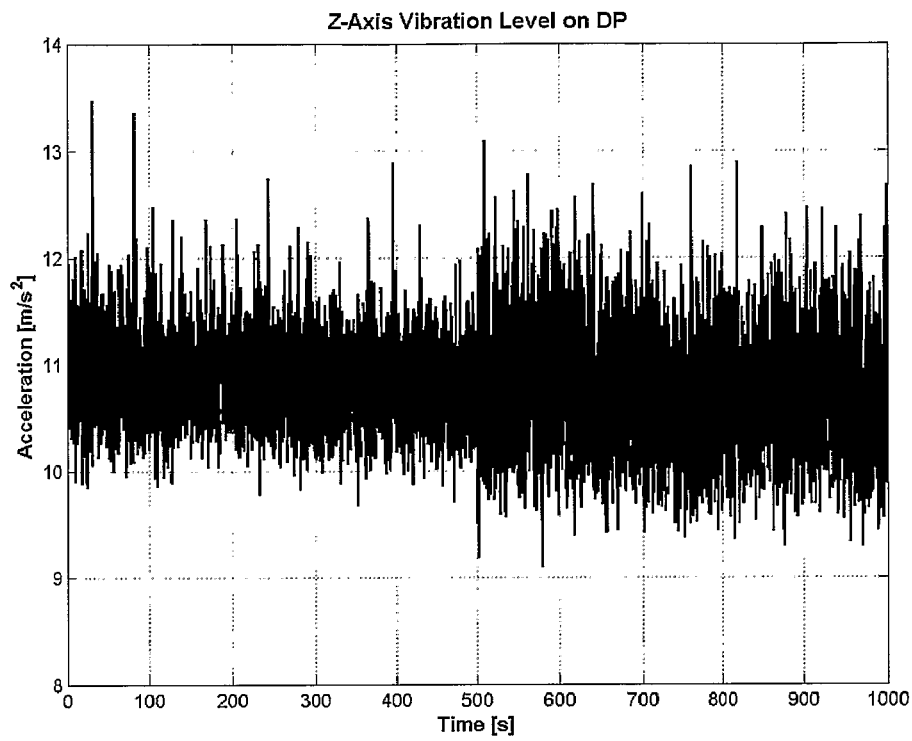
FIGS. 7a to 7d show root-mean-squared (rms) values of the vibration acceleration and acoustical noise signals and their asymptotic upper and lower bound curves (thick solidlines), respectively.
Figure 7B:
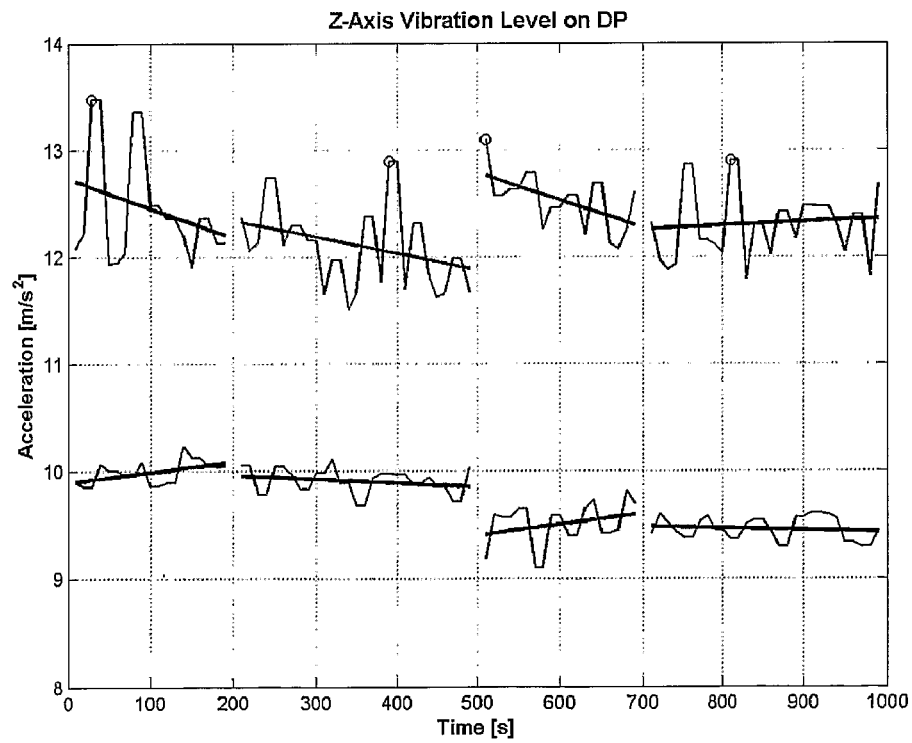
Figure 7C:
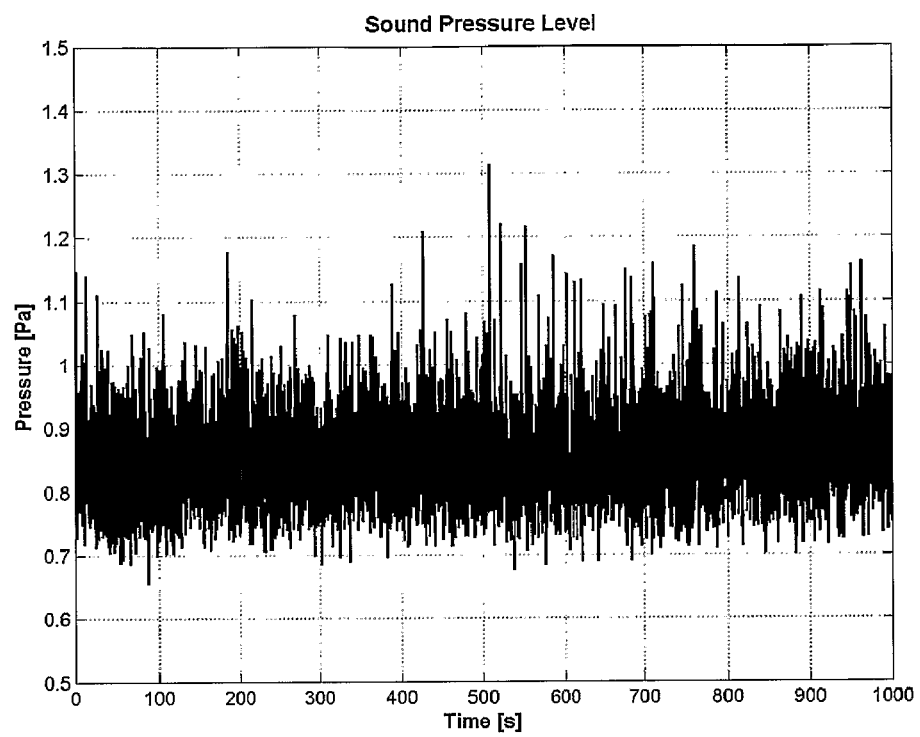
Figure 7D:
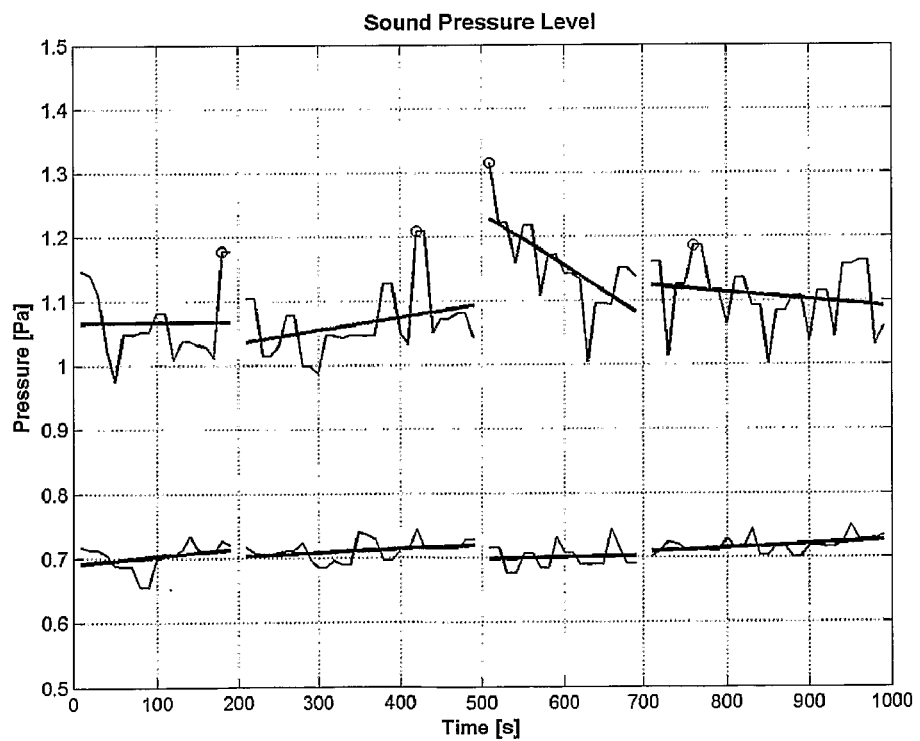

FIGS. 7a and 7c show the root-mean-squared values of the vibration acceleration on the booster pump and the acoustical noise measured near the mid position between the booster and dry pumps. The frequency bandwidth of the vibration acceleration was chosen to be 10 Hz to 10 kHz and that of the acoustical noise signal to be 20 Hz to 20 kHz, respectively. Both signals were digitally sampled at the rate of 40.96 kHz (i.e. 40,960 samples per second). Each block of 4096 samples (equivalent to the interval of 100 ins) were used to calculate the root-mean-squared (rms) values shown in FIGS. 7a and 7c. Each record of 200 sequential samples (equivalent to the 20-second record) was used to sort out the mean, maximum and minimum values of the vibration acceleration and acoustical noise levels (the thin solid lines) shown in FIGS. 7b and 7d. The estimated model parameters of their asymptotic upper and lower curves and mean and peak values were listed in Table 2. Those model parameters were estimated from the four stepped operation conditions (two gas-loaded operation states and two idle states as previously given in Table 1). The vibration acceleration and acoustical noise levels in FIGS. 7a to 7d are shown to not exhibit noticeable gas-load dependent characteristics unlike those of the inlet and exhaust pressures and the supply currents of the booster and dry pumps shown in FIGS. 5a to 5d and 6a to 6d. The asymptotic lower bounds of the vibration acceleration and acoustical noise levels are shown to be quite even regardless to the gas loading conditions but their asymptotic upper bounds are shown to reveal the gradually increasing or decreasing rates (i.e. positive and negative-signed slopes). The highly fluctuating signal components are observed from the upper bound levels as shown in FIGS. 7a to 7d. The peak values of the fluctuating components for the four operation steps, marked by the "circle" symbol in FIGS. 7b and 7d, were chosen to be another operation characteristic value. Their levels given in the Table 2 are useful to judge what extent of excessive vibration and acoustic noise levels occurs during each operation step.

Table 2 illustrates the evaluated operation characteristic values for the vibration acceleration and acoustical noise levels. Note that $a_U$ and $b_U$ denote the slop and initial values of the upper bound curves and $a_L$ and $b_L$ do the slop and initial values of the lower bound curves.

present their analysis results. Furthermore, no fault operation condition caused by those state variables has been observed from the many cases of degraded or failed vacuum pumps. This work does not mean that the evaluation of their operation characteristic values is not needed for the predictive maintenance of vacuum pumps. Actually, their evaluation, as illustrated in Table 1 and 2, can be also made for the precision diagnostic analysis proposed in this work It is very interesting to note that the evaluated operational characteristic values for each state variable can reduce extremely the size of date used to implement the precision diagnostics for the predictive maintenance. The present version of the e-diagnostics guideline [Reference 18: Harvey Wohlwend, e-Diagnostics Guidebook, International SEMATECH, Version 1.5, October, 2002] recommends that the minimum sapling rate for each state variable is set to be 10 Hz (10 samples per second) or higher. The sampling rate in this work was chosen to be 10 Hz awarding to the e-diagnostics guideline. As commented previously, the sampled signals for one thousand seconds were chosen in this work. The total number of samples for each state variable is found to be equal to 10,000. To the contrary, the evaluated operational characteristic values and their time stamps for each static state variable are found to be only 32 data (4 sets of 6 characteristic values and 4 sets of initial and final time stamps). This diagnostic data reduction rate is extremely high. It enables much improvement of the implementation system performance for the predictive maintenance of vacuum pumps. Furthermore, it enables each implementation system to cover the more increased number of vacuum pumps.

2. In-Situ Methods of Evaluating the Performance Indicators of Vacuum Pumps

It is shown that the operation characteristic values are evaluated for the separated idle and gas-loaded operation conditions. A logical way of separating the pump operation conditions is introduced in this subsection. Since the inlet pressure was directly measured in this work, it is natural to use it for such separation. When the pressure-regulated nitro-

TABLE 2

| | Pump Operation Conditions | | Step 1 Gas-Loaded State 1 0~200 [s] | Step 2 Idle State 1 200.1~500 [s] | Step 3 Gas-Loaded State 2 500.1~700 [s] | Step 4 Idle State 2 700.1~1000 [s] |
|---|---|---|---|---|---|---|
| Vibration Level [m/s$^2$] | Mean Value | | 10.9 | 10.8 | 10.8 | 10.7 |
| | Upper Bound | $a_U$ | −0.028 | −0.015 | −0.026 | 0.0035 |
| | | $b_U$ | 12.7 | 12.3 | 12.6 | 12.3 |
| | | Peak | 13.5 | 12.9 | 13.1 | 12.9 |
| | Lower Bound | $a_L$ | 0.0097 | −0.0035 | 0.0102 | −0.0017 |
| | | $b_L$ | 9.9 | 10.0 | 9.4 | 9.5 |
| Acoustical Noise Level on DP [Pa] | Mean Value | | 0.83 | 0.85 | 0.85 | 0.86 |
| | Upper Bound | $a_U$ | 0.001 | 0.002 | −0.008 | −0.0012 |
| | | $b_U$ | 1.07 | 1.04 | 1.23 | 1.12 |
| | | Peak | 1.18 | 1.21 | 1.32 | 1.19 |
| | Lower Bound | $a_L$ | 0.0012 | 0.0006 | 0.0002 | 0.0006 |
| | | $b_L$ | 0.69 | 0.70 | 0.70 | 0.71 |

In this work, the characteristics analysis results regarding such pump operation-related state variables as the purge gas pressure and its flow rate, the body temperatures, the cooling water temperature, the lubrication oil pressure and level of the low vacuum pump, are not illustrated. Their operation characteristics, as well known in the conventional trend monitoring and diagnostic analysis, are statistically so stationary that their abnormal condition can be easily detected by using the second order statistics analysis (i.e. the mean and standard deviation analysis). It is the reason that this work does not gen gas is supplied in the reaction chamber, the inlet pressure level of the vacuum pump remains on the desired level, as shown in FIG. 5a. This state is referred to as the gas-loaded condition of the vacuum pump under test, whose inlet pressure level is dependent on the semiconductor fabrication process. After the wanted time interval, the outlet throttle valve of the reaction chamber is almost closed suddenly. The inlet pressure level is decreased to the base level due to the pumping operation of the vacuum pump. The required base level is also dependent on the fabrication process. This test procedure is very similar to the pump down test method to evaluate the pumping speed. If multiple gas-loaded pressure levels are required for the desired fabrication process, their corresponding gas-loaded conditions are simulated to the vacuum pump under test. As illustrated in FIG. 5a, two different gas-loaded conditions are considered in this work since they are sufficient to simulate the real gas loaded conditions required for the fabrication process. The gas load simulation test proposed in this sub-section is one of distinctive achievements contributed by this work since it enables the 'in-situ' evaluation of the pumping speed indicator as demonstrated later. This attempt has been not reported in the previous work [Ref. 1-Ref. 4, Ref. 6-Ref. 9].

Two kinds of inlet pressure transition regions, i.e. positive-going and negative-going ones, are observed from FIG. 5a. The positive-going transition of the inlet pressure mars when the outlet valve of the reaction chamber is opened at the beginning of the performance test for the newly installed vacuum pump and the negative-going one does when the outlet valve is almost closed after the end of the gas-loaded test stage. This work exploits the inlet pressure signals measured in the negative-going transition region in a similar to the pump down test method.

Figure 8A:
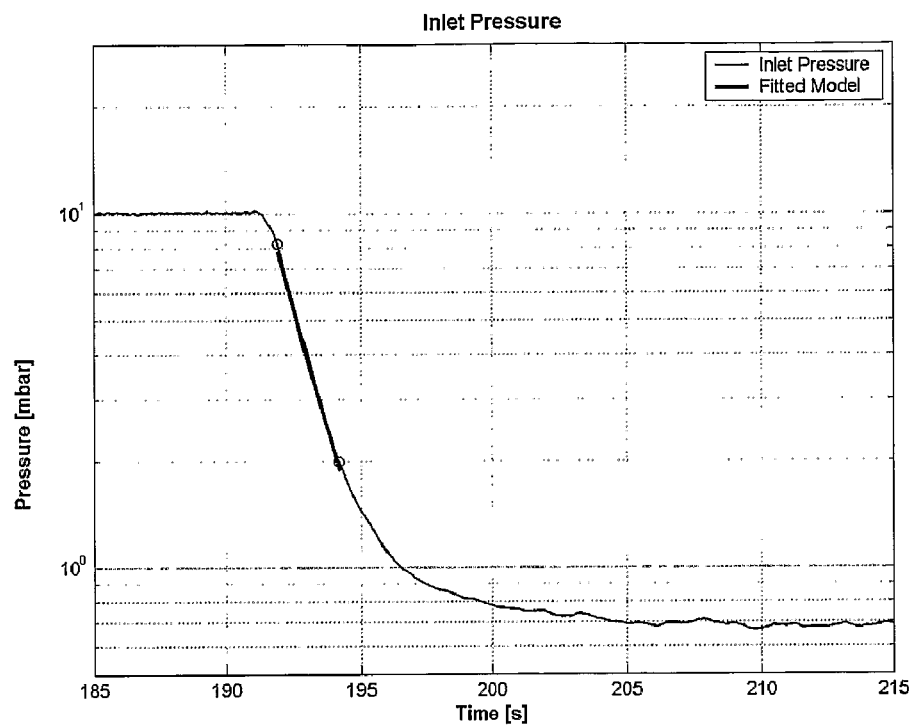
FIG. 8a and 8b show inlet pressure signal of the first and second negative going transition regions existing between the first gas-loaded operation region and the second idle region (The thick solid line indicates the fitted model of the exponentially decaying function)
Figure 8B:
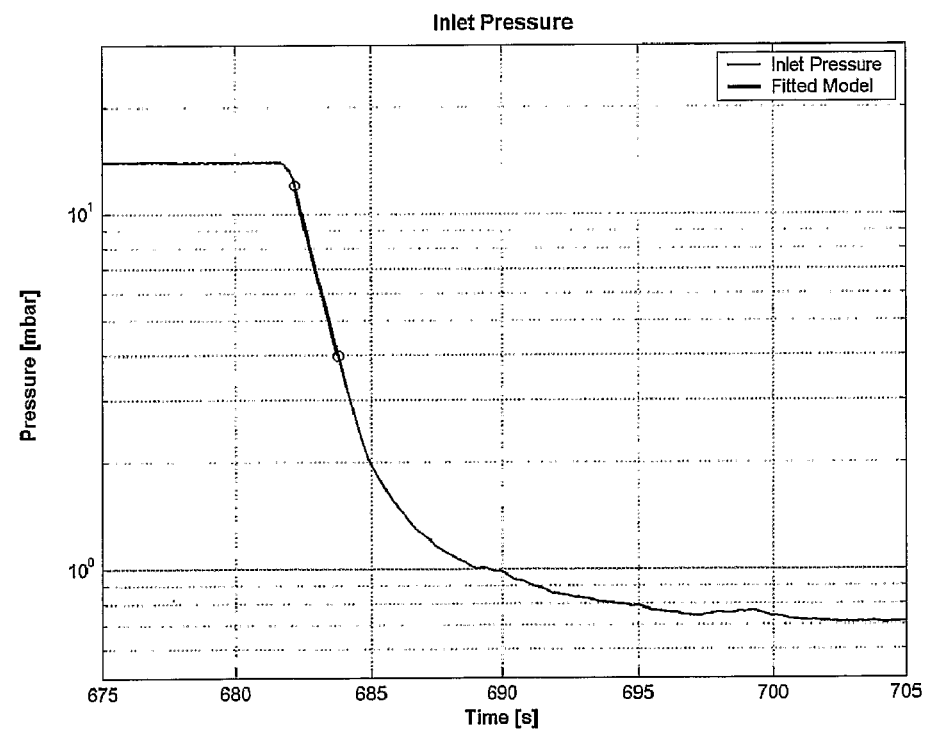
Figure 9A:
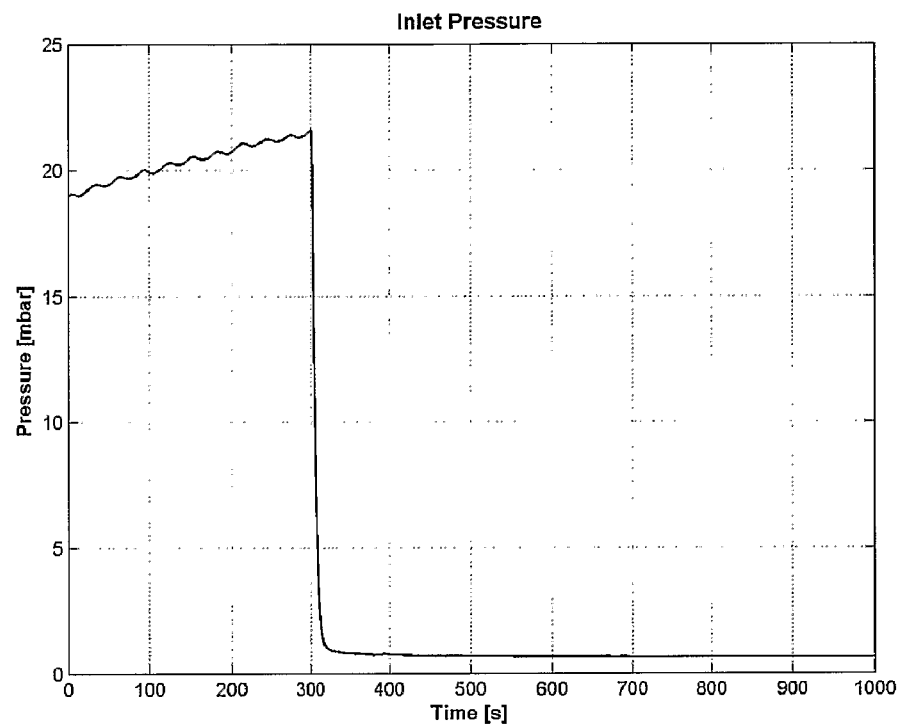
FIGS. 9a to 9f show the measured state variables signals from the vacuum pump running under the extraordinary operation condition.
Figure 9B:
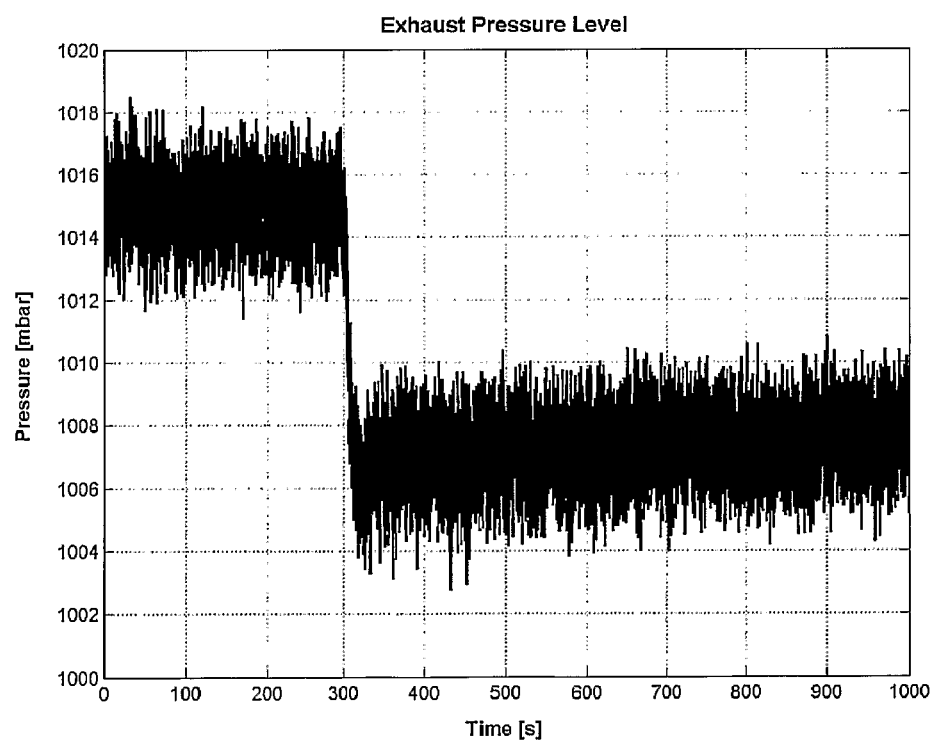
Figure 9C:
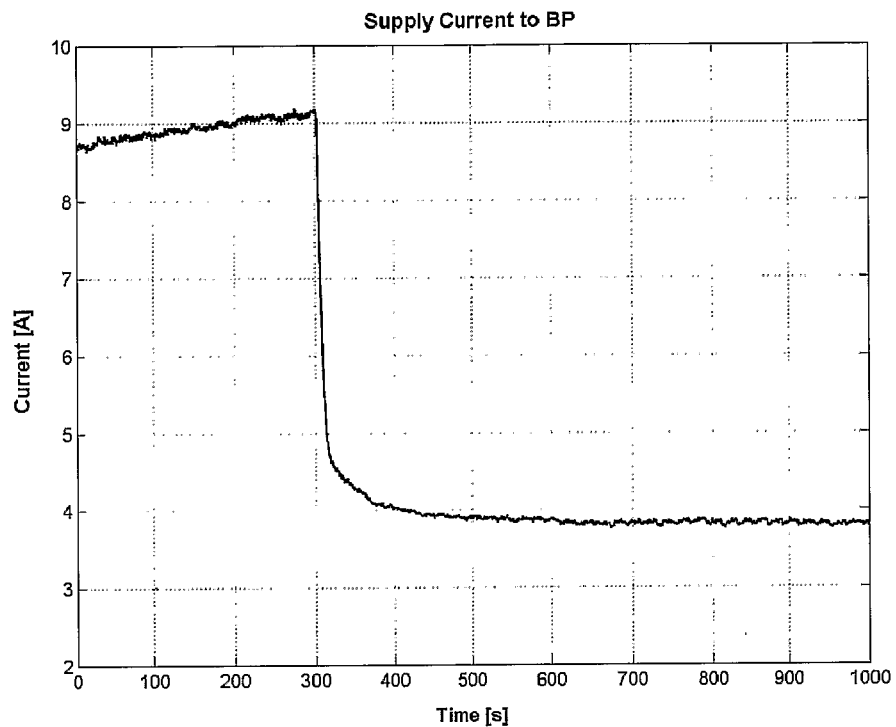
Figure 9D:
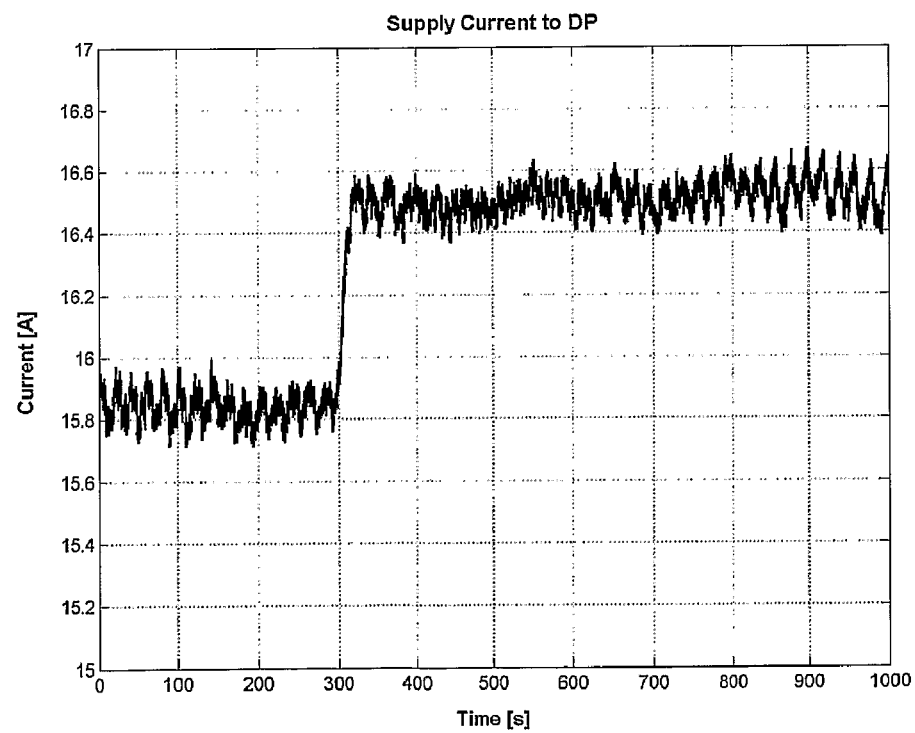
Figure 9E:
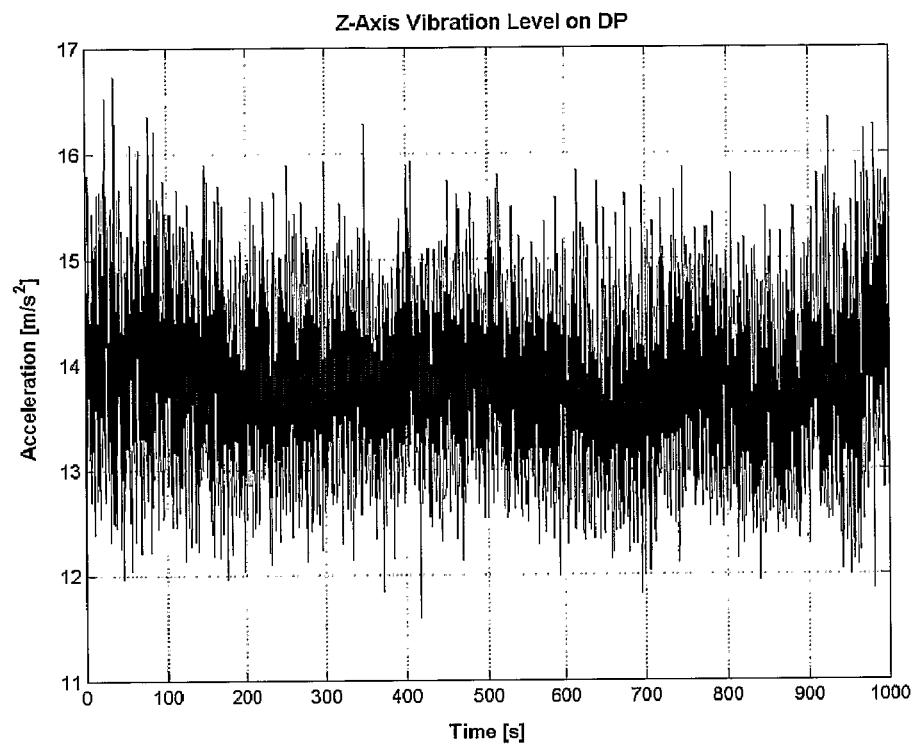
Figure 9F:
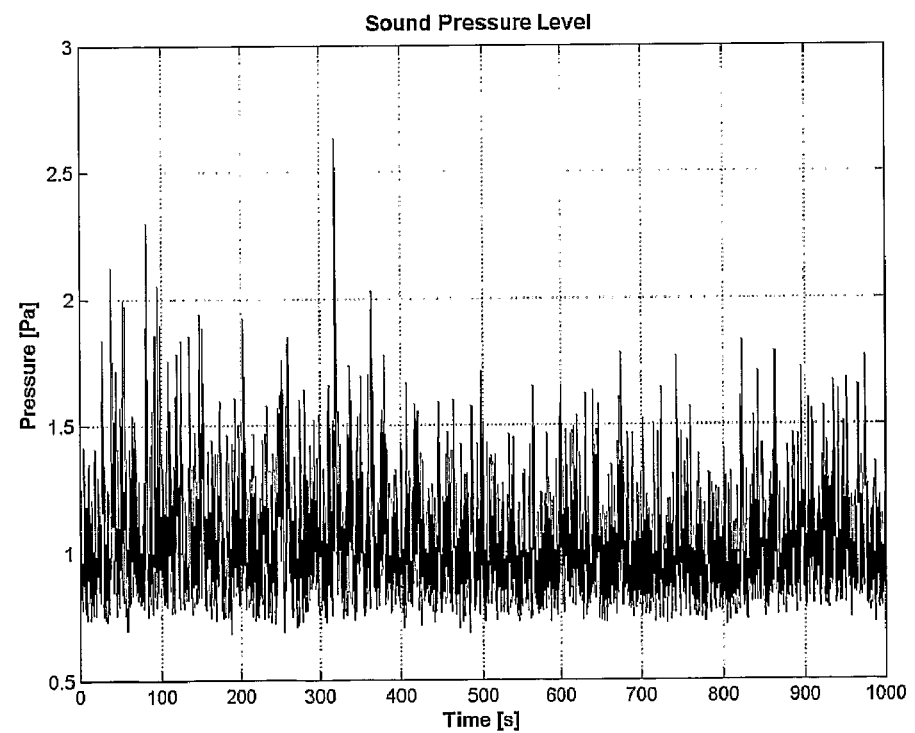

FIGS. 8a and 8b illustrate the inlet pressure signals of (a) the first and (b) the second negative going transition regions existing between the first gas-loaded operation region and the second idle region of FIG. 5a. Note that the thick solid line indicates the fitted model of the exponentially decaying function.

On the onset of this work, it became apparent that the exponential decay characteristics of the inlet pressure signal shown in FIGS. 8a and 8b is directly related to the pumping speed of the installed vacuum pump. The fundamental relationship of pumping speed and pump-down times, well known in the vacuum theory [Reference 19: Nigel. S. Hariss, Modem Vacuum Practice, McGraw-Hill Book Company, Lendon: England, 1989], is exploited in this work. The algebraic equation is given as $$P_n = P_0 \cdot e^{-\alpha \cdot n}, \alpha = 2.77 \times 10^{-4} \cdot \frac{Q}{V} \cdot \Delta T$$ MathFigure 4

In equation (4), the symbols Q and V denote the pumping speed [m$^3$/h] and the volume [m$^3$]. The symbol $\Delta T$ denotes the sampling period in second ($\Delta T$=100 [ms] in this work). The symbol alpha in equation (4) is the exponential decay constant whose value is directly related to the pumping speed.

The formula in equation (4) assumes a constant pumping speed over the pressure range between the initial value P.sub.0 and the final level $P_n$. As a result, the adequate range for the initial and final inlet pressure levels are determined by selecting the linear region on the semi-log plots shown in FIGS. 8a and 8b. The thick solid lines indicate the selected region for the initial and final positions used to estimate the exponential decay constants at the selected pressure regions. The initial and final pressure levels in the first region were selected to be the 80% and 20% levels of the inlet pressure observed before the continuous gas flow stopped. This guideline of selecting the initial and final inlet pressure positions has been proven to be very stable and effective to estimate the exponential decay constants from many field tests. The estimated exponential decay constants are exploited to examine what extent of the pumping speed performance is decreased whenever the performance test is needed for the predictive maintenance of vacuum pumps running in the fabrication process site.

It is quite straightforward to estimate the best-fitted exponential decay constant corresponding to the selected region. Let {Pn: n=1, . . . , N} be the inlet pressure signals sampled in the selected region. Their logarithm values of the inlet pressure signals are obtained as $$y_n = -\alpha \cdot n + \beta, y_n = 1n(P_n) \text{ and } \beta = 1n(P_0)$$ MathFigure 5

The estimation of the best-fitted parameters alpha and beta is obtained by using the least squared method addressed in the previous section, as given in equation in (2). The best-fitted exponential decay constant for the selected region is used to evaluate the approximate pumping speed indicators, which is defined as the pumping speed per unit volume, that is $$I_P = \frac{Q}{V} = 3.6 \times 10^4 \cdot \alpha$$ MathFigure 6

The volume V [m$^3$] to be evacuated is dependent on the pipeline connecting the inlet port of the pump to the exhaust port of the reaction chamber. It is not necessary to be a known value since it must be a constant. It is the reason to use pumping speed indicator in the this work Table 3 illustrates the estimated exponential decay constants and their corresponding estimated pumping speed indicators for the three consecutive negative-going regions of the inlet pressure shown in FIG. 5a. Note that the symbols alpha and Ip denote the exponential decay constant and the pumping speed indicator, respectively.

TABLE 3

| Two Model-Fitted Regions | | First Negative-going Region | Second Negative-going Region |
|---|---|---|---|
| First Region | α | 0.0619 | 0.0682 |
| | $I_P$ | 2.23 × 10$^3$ | 2.45 × 10$^3$ |

The in-situ method, which has been proposed in this work to evaluate the pumping speed indicators by using the measured inlet pressure signals, is very significant since it provide appropriate information for the pump maintenance engineers to decide whether the vacuum pump of interest should be replaced or not by judging what extent of the pumping speed has decreased so far. The proposed in-situ estimation method of the pumping speed indicators is quite a unique one that is not yet discovered even in the recent pump diagnostic technologies [Ref. 1-Ref. 4, Ref. 6-Ref. 9].

The second performance indicator is related to the relationship between the mean inlet and exhaust pressure differences measured from the gas-loaded and idle states. As shown in Table 1, the mean inlet pressure difference between the first gas-loaded state (step 1 in Table 1) and the first idle state (step 2 in Table 1) is seen to be 9.44 [mbar]. Another mean inlet pressure difference between the second gas-loaded state (step 3 in Table 1) and the second idle state (step 4 in Table 1) is also seen to be 13.4 [mbar]. Similarly, two mean exhaust pressure differences, equal to 4.6 [mbar] and 7.1 [mbar] respectively, are also obtained for the two different gas-loaded and idle operation conditions. The ratios of the inlet pressure difference to the exhaust pressure difference are found to be 0.49 (=4.6 [mbar]/9.44 [mbar]) and 0.53 (=7.1 [mbar]/13.4 [mbar]). These evaluated ratios are proposed in this work so as to examine how well the relationship between the inlet and exhaust pressures remains unchanged around the similar gas-loaded operations. Of course, the decreased ratio usually indicates the degraded pump performance.

Here it should be noted that the supply current to the booster pump is also closely related to the gas-loaded level. The mean supply current difference between the first gas-loaded state (step 1 in Table 1) and the first idle state (step 2 in Table 1) is seen to be 2.71 [A]. Another mean supply current difference between the second gas-loaded state (step 3 in Table 1) and the second idle state (step 4 in Table 1) is also observed to be 3.88 [A]. The ratios of the inlet pressure difference to the supply current difference are found to be 0.29 [A/mbar] (=2.71 [A]/9.44[mbar]) and 0.29 [A/mbar] (=3.88 [A]/13.4 [mbar]), respectively. Two ratios are shown to be closely equal to each other. It is a very useful property to examine what extent the excessive supply current level to the booster pump has increased so far in comparison to the initial operation condition. Actually, the ratio of the inlet pressure difference to the supply current difference is the third vacuum pump performance indicator proposed in this work. In a similar way to the supply current to the booster pump, the two difference values of the mean supply current to the dry pump are also obtained. The mean supply current difference between the first idle state (step 2 in Table 1) and the first gas-loaded state (step 1 in Table 1) is seen to be 0.3 [A]. Another mean supply current difference between the second idle state (step 4 in Table 1) and the second gas-loaded state (step 3 in Table 1) is also seen to be a 0.4 [A]. The ratios of the inlet pressure difference to the supply current difference are found to be 0.032 [A/mbar] (=0.3 [A]/9.44[mbar]) and 0.030 [A/mbar] (=0.4 [A]/13.4 [mbar]), respectively. This dependency of the dry pump supply current to the inlet pressure is the fourth vacuum pump performance indicator proposed in this work. Specifically, it should be noted that the supply currents to the booster and dry pumps are directly related to the mechanical load to both motors such that the third and fourth performance indicators can enable the analysis of mechanical load (torque) conditions exerted to the electrical motors of the booster and dry pumps.

The four ends of the vacuum pump performance indicators are proposed and their evaluation methods are in details described in this section. Their evaluation results are illustrated, which are actually regarded as the reference (or initial) performance data regarding the newly installed vacuum mump. It is shown in the next sub-section that those performance indicators are used to examine what extent the current performance of the running vacuum pump is deviated from the reference operation data.

3. Precision Diagnosis Procedures for the Predictive Maintenance of Degraded Vacuum Pumps In the previous two sub-sections, the active algorithms of estimating the operation characteristic values for each measured state variable and the in-situ evaluation methods of the four vacuum pump performance indicators are described in details. When applied to the initial performance test of the newly installed low vacuum pump, the proposed active algorithms and the developed in-situ methods are illustrated to present the estimated characteristic values and the evaluated performance indicators. In this sub-section, their feasibility and effectiveness for the precision analysis of the predictive maintenance of vacuum pumps is examined by applying them to the vacuum pump that has reached to an extraordinary operation condition, that is 'slowly responding' to the desired vacuum level of the reaction chamber. This unexpected vacuum pump operation state has been encountered after a great number of the normal operations. The first work that maintenance engineers should do for the predictive maintenance of the considered vacuum pump is to carry out the in-situ (or field) performance test according to the pre-determined test procedure and then to judge what extent the current performance test results are deviated from the initial (or reference) performance values stored in the vacuum pump maintenance database. But, this systematic approach to the predictive maintenance of vacuum pumps has been not well established even among the leading semiconductor manufacturers or the major vacuum pump suppliers.

The estimated operational characteristic values and the evaluated performance indicators illustrated in the previous sections are actually obtained from the very beginning operation stage of the considered vacuum pump as commented previously. Those illustrated results are regarded as the reference data in this work. FIGS. 9a to 9f show the measured time signals from the vacuum pump running under the extraordinary operation condition. It illustrates the six state variables—(a) the inlet pressure signal and (b) the exhaust pressure signal, (c) the supply currents to the booster pump and (d) the supply currents to the dry pump, and (e) the mechanical vibration signal and (f) the acoustical signal, whose reference characteristic values have been already shown in Tables 1 and 2. As shown in the inlet pressure signal of FIG. 9a, a simple two-stepped (gas-loaded and idle) pump operation is examined. The first step is a slowly increased gas-load operation condition and the second one is the idle state at which the base-leveled inlet pressure keeps constant. These two operation conditions are separated by the short state transition region between the 290 and 320 second positions. It is not easy to distinguish any noticeable abnormal signal component from the illustrated state variable signals in FIGS. 9a to 9f. Their initial signals corresponding to the six state variables, regarded as the reference ones, are illustrated in FIGS. 5a to 5d and FIGS. 7a and 7c, which were measured at the very beginning of the newly installed vacuum pump. Their comparison may lead to the observation that the mechanical vibration and acoustical noise levels of the current vacuum pump have increased more than those for the initial performance test condition. These observed results are not sufficient for maintenance engineers to decide whether the vacuum pump of interest should be replaced or not. It is one of challenging issues that many maintenance engineers have encountered with in the real semiconductor fabrication sites.

Given the measured signals under the two gas-load dependent operation conditions, the first diagnostic step is to estimate the operation characteristic values for each state variable in the same way as done in Section 1. Table 4 shows the listings of the estimated operation characteristic values of the six measured state variables shown in FIGS. 9a to 9f. Note that BP and DP denote the booster and dry pumps and that $a_U$ and $b_U$ denote the slop and initial values of the asymptotic upper bound curves and $a_L$ and $b_L$ do the slop and initial values of the asymptotic lower bound curves.

TABLE 4

| | Pump Operation Conditions | | Step 1 Gas Loaded State 1 | Step 2 Idle State 1 | | Pump Operation Conditions | | Step 1 Gas Loaded State 1 | Step 2 Idle State 1 |
|---|---|---|---|---|---|---|---|---|---|
| Inlet Pressure [mbar] | Mean Value | | 20.3 | 0.75 | Exhaust Pressure [mbar] | Mean Value | | 1014.9 | 1007.3 |
| | Upper Bound | $a_U$ | 0.084 | −0.003 | | Upper Bound | $a_U$ | −0.024 | 0.009 |
| | | $b_U$ | 19.3 | 0.77 | | | $b_U$ | 1018.1 | 1009.8 |
| | Peak Value | | 21.4 | 1.06 | | Peak Value | | 1018.5 | 1010.8 |
| | Lower Bound | $a_L$ | 0.086 | −0.002 | | Lower Bound | $a_L$ | −0.001 | 0.021 |
| | | $b_L$ | 19.1 | 0.73 | | | $b_L$ | 1012.0 | 1003.7 |

TABLE 4-continued

| Pump Operation Conditions | | | Step 1 Gas Loaded State 1 | Step 2 Idle State 1 | Pump Operation Conditions | | | Step 1 Gas Loaded State 1 | Step 2 Idle State 1 |
|---|---|---|---|---|---|---|---|---|---|
| BP Supply Current [A] | | Mean Value | 8.93 | 3.86 | DP Supply Current [A] | | Mean Value | 15.8 | 16.5 |
| | Upper Bound | $a_U$ | 0.015 | −0.003 | | Upper Bound | $a_U$ | −0.002 | 0.002 |
| | | $b_U$ | 8.79 | 3.98 | | | $b_U$ | 16.0 | 16.6 |
| | | Peak Value | 9.19 | 4.10 | | | Peak Value | 16.0 | 16.7 |
| | Lower Bound | $a_L$ | 0.015 | −0.003 | | Lower Bound | $a_L$ | 0.0000 | 0.0004 |
| | | $b_L$ | 8.67 | 3.91 | | | $b_L$ | 15.7 | 16.4 |
| Vibration Level on DP [m/s$^2$] | | Mean Value | 13.9 | 13.8 | Acoustic Noise Level [Pa] | | Mean Value | 1.07 | 1.02 |
| | Upper Bound | $a_U$ | −0.033 | 0.0056 | | Upper Bound | $a_U$ | −0.011 | −0.003 |
| | | $b_U$ | 16.3 | 15.5 | | | $b_U$ | 1.99 | 1.75 |
| | | Peak Value | 16.7 | 16.3 | | | Peak Value | 2.29 | 2.63 |
| | Lower Bound | $a_L$ | −0.002 | 12.2 | | Lower Bound | $a_L$ | −0.001 | 0.0004 |
| | | $b_L$ | −0.002 | 12.3 | | | $b_L$ | 0.75 | 0.73 |

It is shown from Table 4 that the mean inlet pressure level for the gas-loaded running condition is 20.3 [mbar] and that the mean inlet base pressure is 0.73 [mbar]. This gas-loaded operation range is quite close to the second case of the initial gas-loaded operation conditions, i.e. the third and fourth operation step (step 3 and 4) in Table 1 whose mean inlet pressure levels are 14 [mbar] for the gas-loaded operation condition and 0.7 [mbar] for the idle one, respectively. It should be noted that this small increase in the gas-loaded inlet pressure was made due to the last products-related process condition, not due to the degraded vacuum pump performance. Moreover, the mean exhaust pressure level under the idle state is seen to increase from the initial value of 1000.3 [mbar] (i.e. the mean value of the exhaust pressure of step 2 and step 4 in Table 1) to the current one of 1007.3 [mbar] (i.e. the mean value of the exhaust pressure of step 2 in Table 4). It is due to the increase of the ambient pressure at the different dates. In order to overcome this unwanted effect of the ambient pressure on the measured exhaust pressure level, this work has already proposed the use of the relative value of the exhaust pressure level to the mean exhaust pressure level of the idle state, as commented in Section 2. The difference value between the exhaust pressure levels for the gas-loaded and idle states is used in this work. The exhaust pressure difference values for both cases of the initial operation (i.e. step 3 and step 4 in Table 1) and the current one (i.e. step 1 and step 2 in Table 4) are observed to be 7.1 [mbar] and 7.6 [mbar], respectively. It is obvious that the small change of the mean gas-loaded inlet pressure level from 14 [mbar] to 20.3 [mbar] does not cause any noticeable increase of the exhaust pressure. It may indicate that the exhaust pressure signal is not sensitive to the change of the gas-loaded level of the vacuum pump. It is the reason that this work strongly recommends the direct use of the inlet pressure signal for the state monitoring and diagnostic analysis for the predictive maintenance of vacuum pumps.

In Table 4, the mean value of the booster pump (abbreviated by "BP") supply current for the current gas-loaded operation state is shown to be 8.93 [A]. It is a slightly increased value, compared to the initial mean value of 8.22 [A] (see the mean BP supply current value of step 3 in Table 1). The mean value of the BP supply current for the current idle operation state is also observed to be 3.86 [A], which is a little decreased value in comparison to the initial mean value of 4.34 [A] (see the mean BP supply current value of step 4 in Table 1). Unlike this small change in the BP supply current, the mean values of the measured dry pump (abbreviated by "DP") supply currents for the gas-loaded and idles states, equal to be 15.8 [A] and 16.5 [A] respectively, are shown to be very close those for the initial values, i.e. 15.8 [A] and 16.2 [A] (see the mean DP current values of step 3 and 4 in Table 1). It is obvious that these mean supply currents measured from the current extraordinary running condition of the considered vacuum pump does not exhibit any noticeable change sufficient to justify the performance degradation of the vacuum pump.

It is shown from Table 4 that the mean vibration level measured on the current dry pump is increased to 13.4 [m/s$^2$, rms] from the initial level of 10.8 [m/s$^2$, rms] (refer to the vibration level of the step 3 and 4 in Table 2). Their corresponding peak-valued acceleration levels are also increased from the initial value of 12.9 [m/s$^2$] to the current one of 16.7 [m/s$^2$]. Similarly, the current mean acoustical noise level is increased to 1.07 [Pa, rms] from the initial one of 0.85 [Pa, rms] (refer to the acoustical noise level of the step 3 and 4 in Table 2). Their corresponding peak-valued acoustical noise level is also increased from the initial value of 1.32 [Pa] to the current one of 2.63 [Pa]. These measurement results indicate that the current running condition of the vacuum pump exhibits the 24% and 29% increase of the mean-rms-valued and peak-valued mechanical vibration levels and the 26% and 99% increase of the mean-rms-valued and peak-valued acoustical noise levels. The mechanical vibration and acoustic noise signals, regarded as the dynamic state variables, are shown to yield relatively more increased assessment results for the current running condition of the vacuum pump than the four static state variables commented above. The two dynamic state variables are seen to be more sensitive to the change of the vacuum pump running condition than the static ones. But, those increased levels observed from the mechanical vibration and acoustic noise signals is not sufficient for maintenance engineers to decide the replacement of the considered vacuum pump by a new one since they are regarded to be tolerable in comparison to the mechanical vibration-related diagnostic guidelines [Ref. 2].

As a result, conventional diagnostic approaches discussed so far are found to be not successful in diagnosing the possible causes for the extraordinary operation condition of the considered vacuum pump. It may indicate that the conventional diagnostic approaches using the level analysis of measured state variables provide limited capacity for the precision diagnosis for the early detection of the degraded performance of low vacuum pumps. This limited capacity of the conventional diagnostic approaches has provided the motivation of developing the direct vacuum pump performance indicator evaluation methods suggested in Section 2. The first performance factor suggested in this work is the pumping speed indicator that is evaluated from the measured inlet pressure signal.

Figure 10:
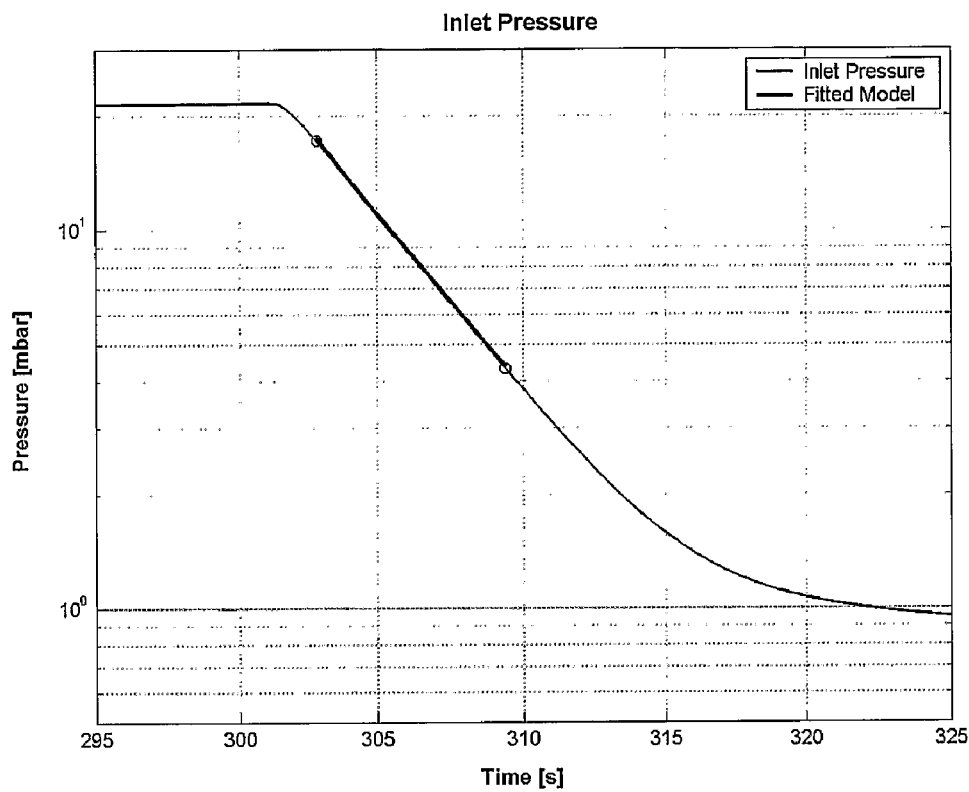

FIG. 10 illustrates the measured inlet pressure signal from negative-going transition region. The thick line indicates the evaluated values form the best-fitted model used to evaluate the pumping speed indicator. The evaluated pumping speed indicator is shown in Table 5.

TABLE 5

| Evaluated Performance Indicators | Extraordinary Operation Condition: Mean Gas-loaded Inlet Pressure = 20.3 [mbar] | Initial (or reference) Operation condition: Mean Gas-loaded Inlet Pressure = 14.0 [mbar] |
|---|---|---|
| Pumping Speed Indicators: [(m³/h)/m³] | 7.58 × 10² | 2.45 × 10³ |
| Ratio of inlet pressure difference to exhaust pressure difference: dimensionless | 0.39 | 0.53 |
| Ratio of inlet pressure difference to BP supply current difference: [A/mbar] | 0.26 | 0.29 |
| Ratio of the inlet pressure difference to DP supply current difference: [A/mbar] | 0.035 | 0.030 |

The current pumping speed indicator evaluated from the extraordinary operation condition is shown to be very decreased up to 31% in comparison to the initial operation condition. This 69% reduction of the pumping speed is obviously found to cause the slow response to the desired vacuum level, i.e. the extraordinary operation condition of the considered vacuum pump. The proposed pumping speed indicator is proven to be very effective for the precision diagnosis of vacuum pumps. Such pumping speed reduction may indicate that the considered pump should be replaced by a new one as early as possible. It is also interesting to note that the ratio of the inlet pressure difference to the exhaust pressure difference is decreased only to 26% in spite of the 69% reduction of the pumping speed. It means that although the mean exhaust pressure level is not so sensitive to the degradation of the pumping speed it still presents useful information about its degradation. The reason is it that the pumping speed is closely related to the decreasing rate of the inlet pressure, not the steady-state base levels of the inlet and exhaust pressure signals. Unlike these two performance indicators, any noticeable difference is not observed from the evaluated supply current-related performance indicators given in Table 5. It may indicate that any external mechanical load (torque) exerted to the booster and dry pumps is not raised. It is obvious that the use of the measured inlet pressure signal as the state variable of the vacuum pump has not only enabled the precision diagnosis of low vacuum pumps but also led to their reliable predictive maintenance. It notifies the significance of the inlet pressure signal for the precision diagnosis for the predictive maintenance. It is one of the major contributions of this work In this sub-section, the six state variables considered are the inlet and exhaust pressures, the supply currents of the booster and dry pumps, the mechanical vibration and acoustical noise signals. The active algorithm of estimating the model parameters adaptive to the operation conditions of the vacuum pumps has been shown to provide the best fitted model parameters $\{a_U, b_U, a_L, b_L\}$ and the mean and peak values for each gas loaded operation condition for each idle or gas-loaded state respectively. As a result, the six parameters are a representative data set for each (idle or gas-loaded) operation condition. Whenever the performance test is needed, a series of the six parameters for all the considered state variables are described in the pair of two-dimensional matrices $$\{p_{Idle}(n,(j-1)\times 6+k)\} \text{ and } \{p_{Load}(n,(j-1)\times 6+k)\} \text{ for } n=1,\ldots; j=1,\ldots,7; k=1,\ldots,6 \quad \text{MathFigure 7}$$

Note that the subscript symbols ("Idle" and "Load") denote the idle and gas-loaded operation conditions. The raw index n denotes the sequence of performance tests. The column indices j and k denote the classification number of the seven state variables and the order of the six parameters for each state variable. The seventh state variable corresponds to the mechanical vibration signal measures on the booster pump although it is not illustrated in this work. The pumping speed indicator, if needed, may be included in the last column of the matrices. The choice of the classification number and the parameter order is made in any convenient way. When either the idle state or the gas-loaded operation state is carried out, its corresponding raw vector is obtained. As the idle and gas-loaded operations are repeated, the two matrixes are obtained.

The matrix data, described in equation (7), are readily used for the diagnostic analysis of the considered vacuum pump by using the well known analysis methods: Single-variable or multi-variable statistical analysis, the Mahalanobis distance analysis [Ref 10], and the process capability analysis [Reference 20: Z. G. Stoumbos, "Process capability indices: Review and extensions," Nonlinear Analysis: Real World Applications, Vol. 3, pp. 191-210, 2002]. Actually in this sub-section, the concept underlying behind the single-variable statistical analysis was exploited to illustrate how well the estimated characteristic values can be used for the precision diagnostic analysis for the predictive maintenance of low um pumps. The illustrated contents and logical sequences in the previous sub-sections are well matched with the single-variable statistical analysis. But the multi-variable analysis, including the process capability analysis and the Mahalanobis distance analysis, has been not yet considered so far because their technical discussions are beyond the scope of this work. This work prefers to the Mahalanobis distance analysis rather than either the multi-variable analysis or the process capability analysis. The reason is it that it has always provided us with more sensitive responses to the small variation of the estimates model parameters. The matrix data, which consists of the best-fitted model parameters and the mean peak values for the dynamic characteristics imbedded in the measured state variables, is shown to lead to another effective way for the precision diagnostic analysis for the predictive maintenance of vacuum pumps. This transplantation of the structured data matrixes to such conventional analysis algorithms (the multivariable statistical analysis, the process capability analysis, and the Mahalanobis distance analysis) is surely one of the achievements contributed by this work.

Implementation System

This section introduces technical details required to realize the implementation system for the precision diagnostic analysis for the predictive maintenance of low vacuum pumps.

Figure 11:
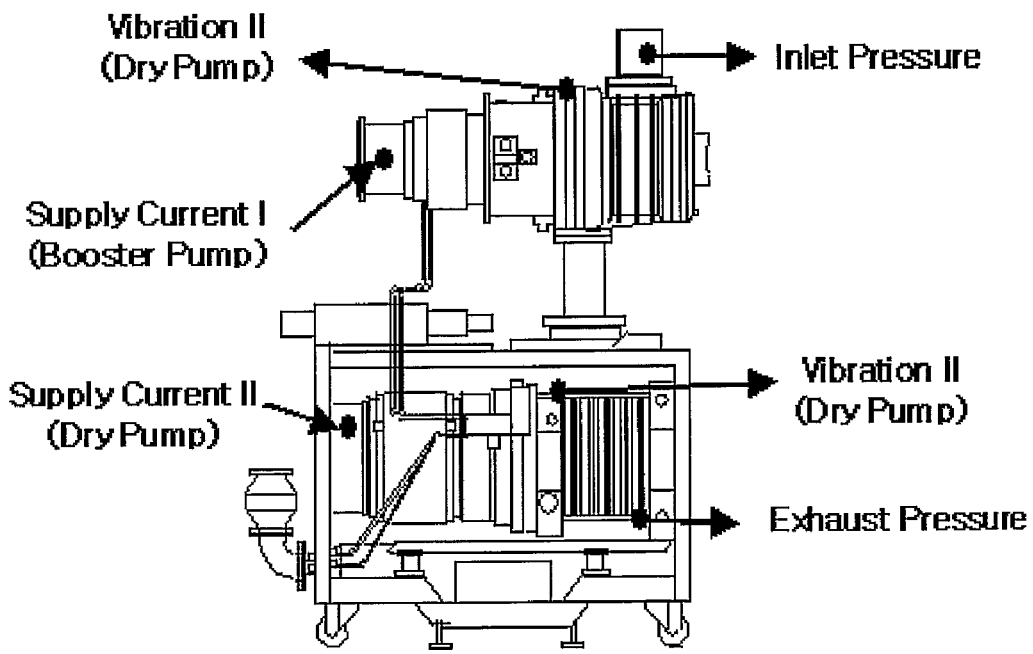
FIG. 11 shows the schematic layout of the state variables measured by the implementation system of the precision diagnosis analysis for the predictive maintenance of low vacuum pumps.

FIG. 11 shows the schematic layout of the state variables measured by the implementation system of the precision diagnosis analysis for the predictive maintenance of low vacuum pumps. As already introduced in the previous sections, the implementation system was designed to measure directly the seven state variables: the inlet and exhaust pressure signals, the supply currents to the booster and dry pumps, the mechanical vibration signals on the booster and dry pumps, and the acoustic noise signal measured from the gap between the booster and dry pumps.

To measure the inlet pressure, the vacuum gauge with the adequate range for multiple gas-loaded conditions are installed in the intake port of the vacuum pump. To measure the exhaust pressure, the pressure transducer with the full-scale range of two to three-fold atmospheric pressure level is installed very near the exhaust port of the dry pump. To measure the supply currents of the booster and dry pumps, the current probes tolerable to the peak current levels are used. To measure the mechanical vibration on the booster and dry pumps, two accelerometers durable for the high temperature range (i.e. up to 150° C. or higher) are installed rigidly on the body surface of the booster and dry pumps. To measure acoustic noise generated from the vacuum pump, the measurement microphone dedicated for the high acoustic pressure range (i.e. ¼"-sized model) is installed near the mid position between the booster and dry pumps. These mechanical and electrical sensors are connected to the dedicated signal conditioning unit that does not only supply each sensor dependent electrical input power but also amplifies each sensor output voltage to the desired level to external instruments. This invention, as illustrated in Sections 1 to 3 previously, recommends to use the listed mechanical and electrical sensors in order to implement the precision diagnostics for the failure protection and predictive maintenance of low vacuum pumps used for the modern semiconductor fabrication processes. Any conventional pump monitoring system does not use all of the seven state variables listed above. If one or more sensor outputs listed above are available for external use, their output signals can be also connected to the reserved input channels of the signal conditioning unit.

Other state variables, such as the purge gas pressure and its flow rate, the body temperatures, the cooling water temperature, the lubrication oil pressure and level of the vacuum pump, are not directly measured since they are available from the conventional pump monitoring system already installed in the low vacuum pumps. The indirect collection of those state variables are actually made in aid of the PC-based data reading software provided by the pump suppliers. When the external connectors to those state variables collected indirectly are available, the multi-channel data acquisition (DAQ) system of the implementation system is designed to read their signals.

Figure 12:
FIG. 12 shows the implementation system for the precision diagnostic analysis for the predictive maintenance of low vacuum pumps, which has been installed in the semiconductor fabrication site.
Figure 13:
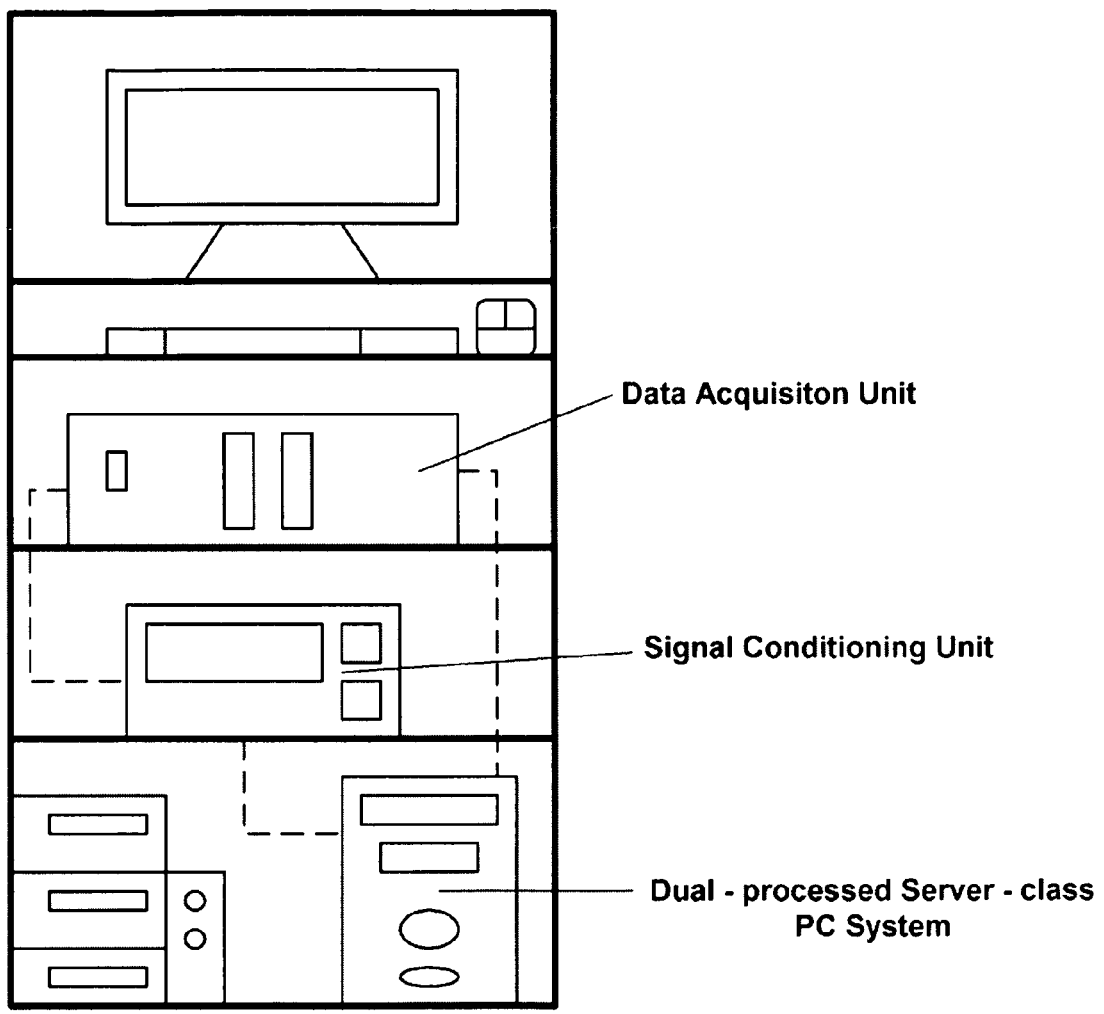
FIG. 13 shows individual components making up the implementation system for the precision diagnostic analysis for the predictive maintenance of low vacuum pumps.

FIG. 12 illustrates the implementation system for the precision diagnostic analysis for the predictive maintenance of low vacuum pumps, which has been installed in the semiconductor fabrication site. It consists of the three main parts: The signal conditioning unit, the multi-channel data acquisition (DAQ) system, and the server-class PC system. The signal conditioning unit dedicated for the seven sensor introduced above includes their own input power suppliers and output voltage amplifiers respectively. The high-performance DAQ system consists of the simultaneous 16-channel sample-and-holders and the 16-channel 24-bit analog-to-digital (AD) converters with the maximum sampling rate of 100 kHz. The dual-processed server-class PC system is specifically selected to realize the reliable throughput of the sampled data of the DAQ system through the interface of MXI-II supplied by the National Instrument Co. The data acquisition program was developed in this work by using the LabView supplied by the National Instrument Co. This PC system also implements all the digital signal processing schemes already addressed in the previous sections. FIG. 13 depicts individual components of the implementation system with the dual-processes server-class PC system. As depicted in FIG. 13, the DAQ system and the signal conditioning unit are connected to the dual-processes server-class PC system A compact version of the implement system, which is portable and easily movable in the real process sites, is under development. Its size is expected to be much smaller than the current implement system shown in FIG. 12

Process Flowcharts

Figure 14:
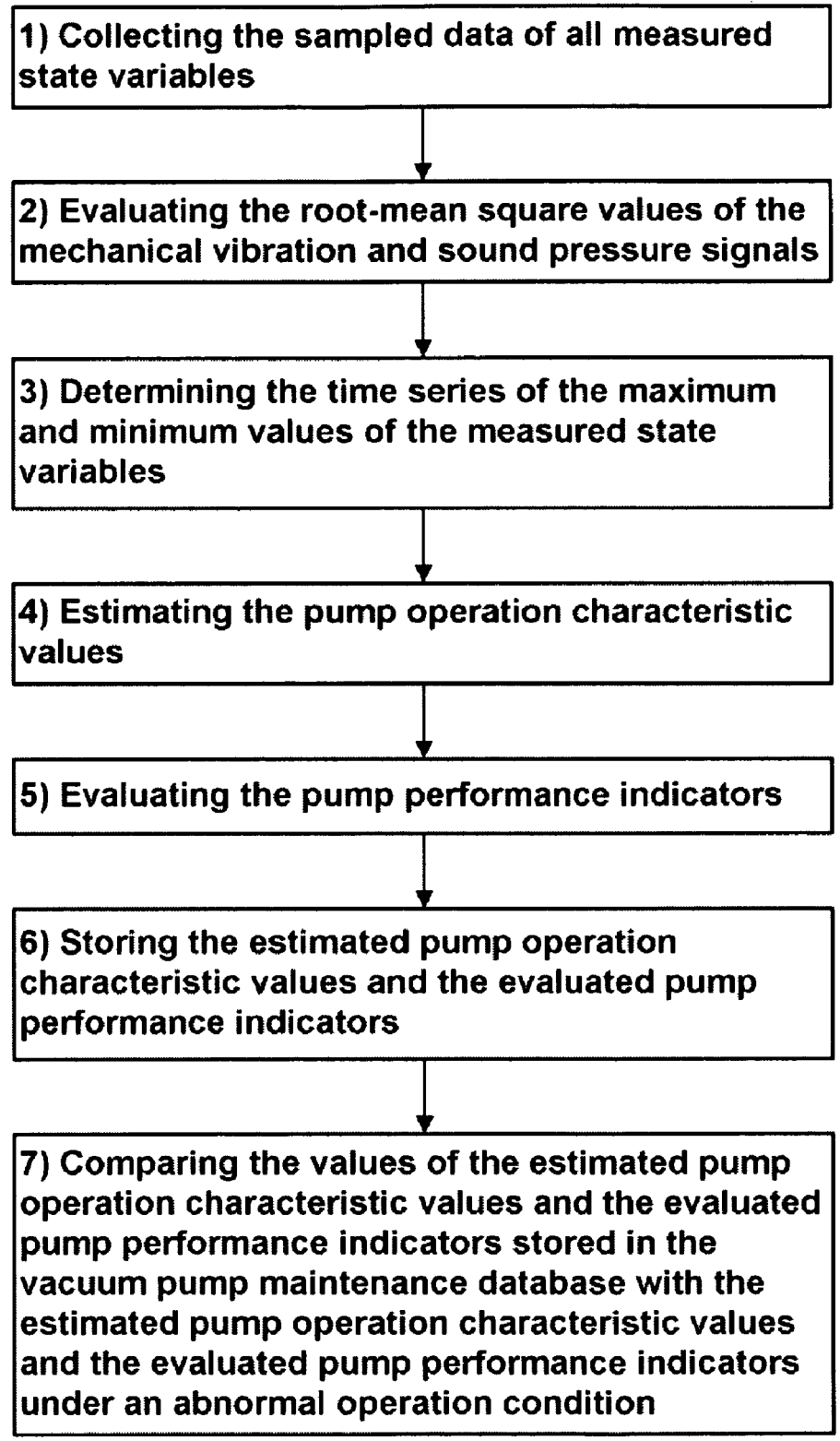
FIG. 14 shows a flowchart listing functional steps performed by the implementation system for the precision diagnostic analysis for the predictive maintenance of low vacuum pumps.

FIG. 14 shows a flowchart listing functional steps performed by the implementation system for the precision diagnostic analysis for the predictive maintenance of low vacuum pumps. These steps include: 1) collecting various pump operation-related state variables of a newly installed vacuum pump with a predetermined sampling rate for the idle and different gas-loaded conditions; 2) determining the maximum and minimum values of the time series of said state variables from each set of consecutively sampled signals over the user selected period which should be longer than the dominant period of fluctuating state variable signal components for the idle and different gas-loaded conditions; 3) estimating the pump operation characteristic values using parametric model-based active diagnostic algorithms for the idle and different gas-loaded conditions; 4) evaluating the pump performance indicators of said newly installed vacuum pump using an in-situ evaluation method; 5) storing the estimated pump operation characteristic values and the evaluated pump performance indicators of said newly installed vacuum pump in the vacuum pump maintenance database; 6) repeating the steps from 1) to 5) whenever the said newly installed vacuum pump is monitored to be under an abnormal operating condition; and 7) comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

Figure 15:
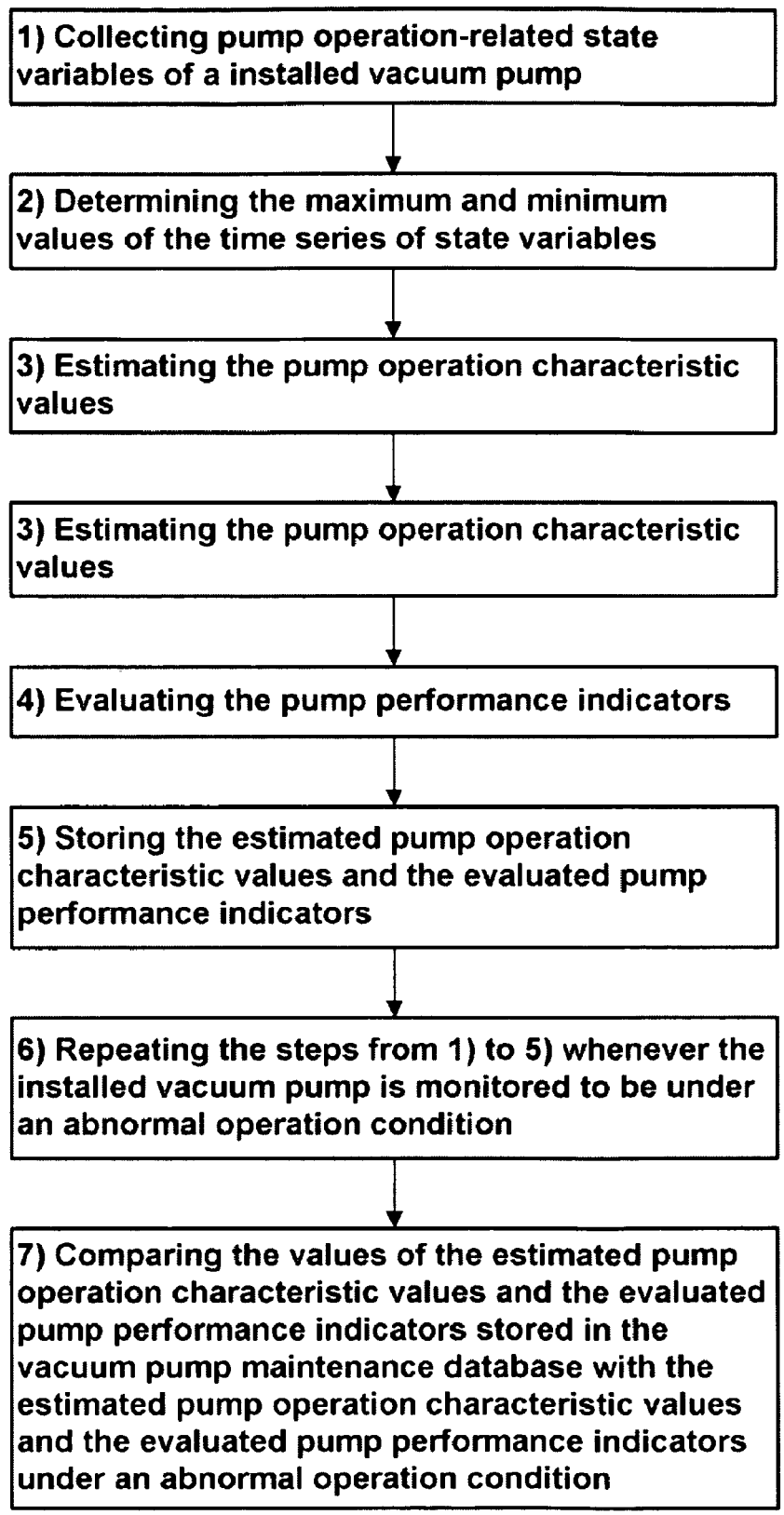
FIG. 15 shows a flow chart listing functional steps for a method for failure protection and predictive maintenance of a vacuum pump according to an embodiment of the invention.

FIG. 15 shows a flow chart listing functional steps for a method for failure protection and predictive maintenance of a vacuum pump according to an embodiment of the invention. These steps include: collecting the sampled data of all measured state variables from the DAQ system in a real-time without any loss of data transfer; evaluating the root-mean-square values of the mechanical vibration and sound pressure signals; determining the time series of the maximum and minimum values of said measured state variables from each set of consecutively sampled signals for the idle and different gas-loaded conditions; and estimating the pump operation characteristic values comprising the best-fitted model parameters and the mean and peak values of said measured state variables using parameter model based active diagnostic algorithms; and evaluating the pump performance indicators of the newly installed vacuum pump using an in-situ evaluation method; and storing the pump operation characteristic values and the pump performance indicators of the newly installed vacuum pump in the vacuum pump maintenance database; and comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

INDUSTRIAL APPLICABILITY

According to the present invention, the most challenging issues in this work have been to find systematic ways of enabling maintenance engineers to decide an adequate time for the replacement of vacuum pumps on the basis of their current performance assessment result. Further, the comparison of the currently evaluated diagnostics analysis results and the initial (or reference) data set is shown to enable maintenance engineers to decide the replacement of the considered vacuum pump according to the evaluated pump performance indicators. Also, the evaluated pumping speed indicator of the current vacuum pump is reported to decrease substantially. This quantitative diagnostic analysis result is expected not only to enable maintenance engineers to decide an adequate time for the replacement of vacuum pumps on the basis of their current performance assessment results but also to improve the reliability and confidence of the predictive maintenance of low vacuum pumps.

We claim:

1. A precision diagnostic method for the failure protection and predictive maintenance of a vacuum pump, comprising the steps of:
   1) collecting various pump operation-related state variables of a newly installed vacuum pump with a predetermined sampling rate for the idle and different gas-loaded conditions;
   2) determining the maximum and minimum values of the time series of said state variables from each set of consecutively sampled signals over the user selected period which should be longer than the dominant period of fluctuating state variable signal components for the idle and different gas-loaded conditions;
   3) estimating the pump operation characteristic values using parametric model-based active diagnostic algorithms for the idle and different gas-loaded conditions;
   4) evaluating the pump performance indicators of said newly installed vacuum pump using an in-situ evaluation method;
   5) storing the estimated pump operation characteristic values and the evaluated pump performance indicators of said newly installed vacuum pump in the vacuum pump maintenance database;
   6) repeating the steps from 1) to 5) whenever the said newly installed vacuum pump is monitored to be under an abnormal operating condition; and
   7) comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

2. The method of claim 1, wherein the vacuum pump is used in semiconductor manufacturing processes.

3. The method of claim 1, wherein the pump operation-related state variables comprise the inlet and exhaust pressures, the supply currents of the booster and dry pumps, the root-mean-square (rms) value of the mechanical vibration and acoustic noise signals.

4. The method of claim 1, wherein the dominant period of fluctuating state variable signal components is determined by using the FFT (fast Fourier transform) analysis and is used to sort the maximum and minimum values of the consecutively sampled time series of state variables.

5. The method of claim 1, wherein the in-situ evaluation method involves measuring the inlet pressure signal as the reference in a similar way to the pump down test method where the negative-going transition of the inlet pressure is used to evaluate the pumping speed.

6. The method of claim 1, wherein the precision diagnostic method involves constructing a pair of two-dimensional structured data matrices which comprises the estimated pump operation characteristic values of the measured pump operation-related state variables evaluated for each idle or gas-loaded operation condition as follows:

$$\{p_{idle}(n,(j-1)\times K+k)\} \text{ and } \{p_{Load}(n,(j-1)\times K+k)\}$$

for n=1, . . . ;

j0.1, . . . , J (total number of measured pump operation-related state variables);

k=1, . . . , K (total number of pump operation characteristic values) wherein the subscript symbols "Idle" and "Load" denote the idle and gas-loaded operation conditions and the raw index n denotes the sequence of performance tests and the column indices j and k denote the classification number of the pump operation-related state variables and the order of the pump operation characteristic values for each state variable.

7. The method of claim 1, wherein the pump operation characteristic values comprise the best-fined model parameters of the upper and lower asymptotic curves, the mean and peak values of each measured state variable for the separated idle and different gas-loaded conditions.

8. The method of claim 7, wherein the best-fined model parameters are obtained by using a linear model for describing the upper and lower asymptotic curves of each measured state variable, which is given as $$y_{k,n}=a_k n+b_k$$

where in above equation, the subscript k denotes the upper or lower asymptotic models {k=U or L} and if the time series of the maximum and minimum values sorted for each pumping state to be $\{y_{k,n}: n=1, 2, \ldots, N\}$, then best-fined model parameters are obtained by using the least squared method as below:

$$a_k = \frac{N \cdot \sum_{n=1}^{N} n \cdot y_{k,n} - \sum_{n=1}^{N} n \cdot \sum_{n=1}^{N} y_{k,n}}{N \cdot \sum_{n=1}^{N} n^2 - \left(\sum_{n=1}^{N} n\right)^2},$$

-continued $$b_k = \frac{\sum_{n=1}^{N} n^2 \cdot \sum_{n=1}^{N} y_{k,n} - \sum_{n=1}^{N} n \cdot \sum_{n=1}^{N} n \cdot y_{k,n}}{N \cdot \sum_{n=1}^{N} n^2 - \left(\sum_{n=1}^{N} n\right)^2}$$

where the first parameters $\{a_k: k=U \text{ or } L\}$ in equation are the slope of the upper and lower asymptotic curves for each measured state variable and the second parameters $\{b_k: k=U \text{ or } L\}$ indicate each initial values of the upper and lower asymptotic curves.

9. The method of claim 1, wherein the pump performance indicators comprise a pumping speed indicator which is evaluated by an in-situ evaluation method, a ratio of inlet pressure difference to exhaust pressure difference, a ratio of inlet pressure difference to BP (Booster Pump) supply current difference, and a ratio of the inlet pressure difference to DP (Dry Pump) supply current difference which are evaluated from the pump operation characteristic values.

10. The method of claim 9, wherein the pumping speed indicator is defined as the pumping speed per unit volume, that is $$I_P = \frac{Q}{V} = 3.6 \times 10^4 \cdot \alpha$$

where the symbols alpha and Ip denote the exponential decay constant and the pumping speed indicator and the symbols Q and V denote the pumping speed [m³/h] and the volume [m³] to be evacuated and the exponential decay constant is obtained from the logarithm values of the inlet pressure signals $\{P_n: n=1, \ldots, N\}$ corresponding to the negative going transition region defined as $y_n = -\alpha \cdot n + \beta$, $y_n = \ln(P_n)$ and $\beta = \ln(P_0)$ where the estimation of the best-fitted exponential decay constant alpha and the initial value beta is obtained by using the least squared method.

11. A precision diagnostic system for the failure protection and predictive maintenance of vacuum pumps, comprising:

a dedicated signal conditioning unit for amplifying the inlet and exhaust pressure transducers, supply current probes to the booster and dry pumps, mechanical vibration sensors and measurement microphones installed at the middle of the booster and dry pumps;

a high-speed, multi-channel data acquisition (DAQ) system adequate for collecting state variables which include mechanical vibration and sound pressure signals with very high frequency components up to 10 Hz~20 kHz; and a dual-processed sever-class PC system with the sufficient performance capacity of collecting the sampled data of all measured state variables from the DAQ system in a real-time without any loss of data transfer; evaluating the root-mean-square values of the mechanical vibration and sound pressure signals; determining the time series of the maximum and minimum values of said measured state variables from each set of consecutively sampled signals for the idle and different gas-loaded conditions; and estimating the pump operation characteristic values comprising the best-fitted model parameters and the mean and peak values of said measured state variables using parameter model based active diagnostic algorithms; and evaluating the pump performance indicators of the newly installed vacuum pump using an in-situ evaluation method; and storing the pump operation characteristic values and the pump performance indicators of the newly installed vacuum pump in the vacuum pump maintenance database; and comparing the values of the estimated pump operation characteristic values and the evaluated pump performance indicators of said newly installed vacuum pump stored in the vacuum pump maintenance database with the estimated pump operation characteristic values and the evaluated pump performance indicators of said newly installed vacuum pump under an abnormal operation condition in order to determine pump replacement.

* * * * *

UNITED STATES PATENT AND TRADEMARK OFFICE
CERTIFICATE OF CORRECTION

| | | |
|---|---|---|
| PATENT NO. | : 7,653,512 B2 | Page 1 of 1 |
| APPLICATION NO. | : 11/721944 | |
| DATED | : January 26, 2010 | |
| INVENTOR(S) | : Cheung et al. | |

It is certified that error appears in the above-identified patent and that said Letters Patent is hereby corrected as shown below:

In claim 6, Col. 30, line 31, replace "j0.1" with --j=0.1--.

In claim 7, Col. 30, line 43, replace "fined" with --fitted--.

In claim 8, Col. 30, line 47, replace "fined" with --fitted--.

In claim 8, Col. 30, line 56, replace "$\{y_{k,n}n:$" with --$\{y_{k,n}:$--.

In claim 8, Col. 30, line 56, replace "best-fined" with --best-fitted--.

Signed and Sealed this

Tenth Day of August, 2010

David J. Kappos
*Director of the United States Patent and Trademark Office*